US012660021B2

(12) United States Patent
Kishida et al.

(10) Patent No.: US 12,660,021 B2
(45) Date of Patent: Jun. 16, 2026

(54) BASE STATION THAT CONTROLS MULTIPLE WIRELESS SIGNAL PROCESSING CIRCUITRY

(71) Applicant: NTT, Inc., Tokyo (JP)

(72) Inventors: Akira Kishida, Musashino (JP); Kengo Nagata, Musashino (JP); Yasuhiko Inoue, Musashino (JP); Yusuke Asai, Musashino (JP); Yasushi Takatori, Musashino (JP)

(73) Assignee: NTT, Inc., Tokyo (JP)

( * ) Notice: Subject to any disclaimer, the term of this patent is extended or adjusted under 35 U.S.C. 154(b) by 444 days.

(21) Appl. No.: 18/017,787

(22) PCT Filed: Jul. 27, 2020

(86) PCT No.: PCT/JP2020/028670
§ 371 (c)(1),
(2) Date: Jan. 24, 2023

(87) PCT Pub. No.: WO2022/024170
PCT Pub. Date: Feb. 3, 2022

(65) Prior Publication Data
US 2023/0292385 A1 Sep. 14, 2023

(51) Int. Cl.
H04W 28/082 (2023.01)
H04W 36/28 (2009.01)
(Continued)

(52) U.S. Cl.
CPC .................................. H04W 76/15 (2018.02)

(58) Field of Classification Search
CPC . H04W 76/15; H04W 36/28; H04W 28/0236; H04W 28/082; H04W 28/0967; H04W 76/27; H04W 84/12
(Continued)

(56) References Cited

U.S. PATENT DOCUMENTS

2019/0158385 A1* 5/2019 Patil ...................... H04W 76/15
2019/0158413 A1* 5/2019 Patil .................. H04W 28/0838
(Continued)

FOREIGN PATENT DOCUMENTS

CN 109803318 A 5/2019
WO 2018009572 A1 1/2018

OTHER PUBLICATIONS

Chitrakar et al (Panasonic Corp.), "Power Consideration for Multi-Link Transmission" IEEE 802.11-19/1536r0 (Sep. 11, 2019) (Year: 2019).*

(Continued)

*Primary Examiner* — Ayman A Abaza
*Assistant Examiner* — Tracy L Williams
(74) *Attorney, Agent, or Firm* — Harness, Dickey & Pierce, P.L.C.

(57) ABSTRACT

A base station of an embodiment includes first and second wireless signal processing units and a link management unit. The link management unit establishes a multi-link with a terminal apparatus by using the first and second wireless signal processing units, and sets a primary link used as a main and a secondary link used as an auxiliary during the multi-link. The link management unit transmits a first wireless frame requesting a change of the primary link to the terminal apparatus by using the first wireless signal processing unit set to the primary link, and the link management unit changes the primary link from the first wireless signal processing unit to the second wireless signal processing unit if either the first or second wireless signal processor receives the affirmative response from the terminal apparatus after the first wireless frame is transmitted.

1 Claim, 26 Drawing Sheets

(51) Int. Cl.
　　H04W 76/15　　　　(2018.01)
　　H04W 76/27　　　　(2018.01)
　　H04W 84/12　　　　(2009.01)

(58) Field of Classification Search
　　USPC ................................................. 370/329, 445
　　See application file for complete search history.

(56)　　　　　　References Cited

U.S. PATENT DOCUMENTS

| | | | | |
|---|---|---|---|---|
| 2019/0239226 | A1* | 8/2019 | Chu | ...................... H04L 5/0037 |
| 2020/0163141 | A1 | 5/2020 | Hsu et al. | |
| 2021/0076249 | A1* | 3/2021 | Hsu | ................... H04W 28/0236 |
| 2021/0360522 | A1* | 11/2021 | Chitrakar | .............. H04L 5/0098 |
| 2021/0360650 | A1 | 11/2021 | Huang | |
| 2021/0377851 | A1* | 12/2021 | Liu | ................... H04W 28/0263 |
| 2021/0409979 | A1* | 12/2021 | Wang | ................. H04W 36/304 |
| 2022/0369403 | A1* | 11/2022 | Fang | ..................... H04W 76/15 |
| 2023/0124052 | A1* | 4/2023 | Li | ..................... H04W 74/0866 |
| | | | | 370/329 |

OTHER PUBLICATIONS

Hu et al. (Facebook Inc.) "Prioritized EDCA Channel Access Over Latency Sensitive Link(s) in MLO" OEEE 802.11-20/408r6 (Sep. 4, 2019) (Year: 2019).*

Garcia-Rodriguez, Adrian; "Multi-Link for Low Latency"; Jan. 10, 2020.
Hu, Chunyu; "Supporting Latency Sensitive Applications in 11be"; May 28, 2020.
Hu, Chunyu; "Prioritizing EDCA Channel Access Over Latency Sensitive Link(s) in MLO"; Mar. 9, 2020.
Chitraker, Rojan; Power Consideration for Multi-Link Transmissions; Sep. 11, 2019.
IEEE Std 802.11-2016, "Figure 4-25 Establishing the IEEE 802.11 association" and "11.3 STA authentication and association", Dec. 7, 2016.
Rojan Chitrakar (Panasonic). Power Consideration for Multi-link Transmissions. IEEE 802.11-19/1536rO, Sep. 14, 2019, Slides 1-10, in particular, slides 2, 5, 6.
Abhishek Patil (Qualcomm), Multi-Link Operation-Link Management. IEEE 802.11-19/1528r5, Jan. 16, 2020, Slides 1-22, in particular, Slide 21, Slide 21.
Ming Gan (Huawei) power save for multi-link. IEEE 802.11-19/1988r3, Jun. 1, 2020, Slides 1-15, entire document.
Yongho Seok (MediaTek). Multi-Link Operation Simulation Methodology. IEEE 802.11-19/1927xl Jan. 30, 2020, Slides 1-23, entire document.
Sai (Cypress). Multiband and Multichannel Operation in IEEE 802.Ilbe, IEEE 802.11-19/1231r1, Jul. 15, 2019, Slides 1-20, entire document.
International Search Report of the ISA (English and Japanese) issued in PCT/JP2020/028670, mailed Dec. 28, 2020; ISA/JP.

* cited by examiner

FROM DATA
PROCESSING
UNIT 110

120

DATA CATEGORIZATION UNIT ~124

125A    125B   125C   125D   125E 126A    126B   126C   126D   126E

LL     VO    VI    BE    BK

DATA COLLISION MANAGEMENT UNIT ~127

TO AT LEAST ONE OF WIRELESS SIGNAL
PROCESSING UNITS 130, 140, AND 150

Fig. 9

| STA FUNCTION | FREQUENCY BAND | LINK DESTINATION ID | MULTI-LINK | TID |
|---|---|---|---|---|
| STA1 | 6GHz | XX | O (PRIMARY) | #1,#2 |
| STA2 | 5GHz | XX | O (SECONDARY) | #1,#3 |
| STA3 | 2.4GHz | - | - | - |

Fig. 13

| STA FUNCTION | FREQUENCY BAND | LINK DESTINATION ID | MULTI-LINK | TID |
|---|---|---|---|---|
| STA1 | 6GHz | XX | ○ (PRIMARY) | #1,#2 |
| STA2 | 5GHz | XX | ○ (SECONDARY) | #1,#3 |
| STA3 | 2.4GHz | – | – | – |

PRIMARY CHANGE ⇨

| STA FUNCTION | FREQUENCY BAND | LINK DESTINATION ID | MULTI-LINK | TID |
|---|---|---|---|---|
| STA1 | 6GHz | XX | ○ (SECONDARY) | #1,#3 |
| STA2 | 5GHz | XX | ○ (PRIMARY) | #1,#2 |
| STA3 | 2.4GHz | – | – | – |

Fig. 17

| STA FUNCTION | FREQUENCY BAND | OPERATION MODE | LINK DESTINATION ID | MULTI-LINK | TID |
|---|---|---|---|---|---|
| STA1 | 6GHz | ACTIVE | XX | O (PRIMARY) | #1,#2 |
| STA2 | 5GHz | ACTIVE | XX | O (SECONDARY) | #1,#3 |
| STA3 | 2.4GHz | OFF | – | – | – | disable ⇩ enable ⇦

| STA FUNCTION | FREQUENCY BAND | OPERATION MODE | LINK DESTINATION ID | MULTI-LINK | TID |
|---|---|---|---|---|---|
| STA1 | 6GHz | ACTIVE | XX | O (PRIMARY) | #1,#2 |
| STA2 | 5GHz | OPERATION PAUSE | XX | O (SECONDARY) | #1,#3 |
| STA3 | 2.4GHz | OFF | – | – | – |

Fig. 19

| STA FUNCTION | FREQUENCY BAND | OPERATION MODE | LINK DESTINATION ID | MULTI-LINK | TID |
|---|---|---|---|---|---|
| STA1 | 6GHz | ACTIVE | XX | O (PRIMARY) | #1,#2 |
| STA2 | 5GHz | OPERATION PAUSE | XX | O (SECONDARY) | #1,#3 |
| STA3 | 2.4GHz | OFF | - | - | - |

PRIMARY CHANGE

| STA FUNCTION | FREQUENCY BAND | OPERATION MODE | LINK DESTINATION ID | MULTI-LINK | TID |
|---|---|---|---|---|---|
| STA1 | 6GHz | OPERATION PAUSE | XX | O (SECONDARY) | #1,#3 |
| STA2 | 5GHz | ACTIVE | XX | O (PRIMARY) | #1,#2 |
| STA3 | 2.4GHz | OFF | - | - | - |

Fig. 23

| STA FUNCTION | FREQUENCY BAND | CHANNEL ID | LINK DESTINATION ID | MULTI-LINK | TID |
|---|---|---|---|---|---|
| STA1 | 6GHz | CH1 | XX | O (PRIMARY) | #1,#2 |
| STA2 | 5GHz | CH2 | XX | O (SECONDARY) | #1,#3 |
| STA3 | 2.4GHz | - | - | - | - |

CHANNEL CHANGE

| STA FUNCTION | FREQUENCY BAND | CHANNEL ID | LINK DESTINATION ID | MULTI-LINK | TID |
|---|---|---|---|---|---|
| STA1 | 6GHz | CH1 | XX | O (PRIMARY) | #1,#2 |
| STA2 | 5GHz | CH3 | XX | O (SECONDARY) | #1,#3 |
| STA3 | 2.4GHz | - | - | - | - |

BASE STATION THAT CONTROLS MULTIPLE WIRELESS SIGNAL PROCESSING CIRCUITRY

CROSS-REFERENCE TO RELATED APPLICATIONS

This application is a 371 U.S. National Phase of International Application No. PCT/JP2020/028670, filed on Jul. 27, 2020. The entire disclosure of the above application is incorporated herein by reference.

TECHNICAL FIELD

An embodiment relates to a base station and a terminal apparatus.

BACKGROUND ART

A wireless local area network (LAN) is known as a wireless system for wirelessly connecting between a base station and a terminal apparatus.

CITATION LIST

Non Patent Literature

NPL 1: IEEE Std 802.112016, "Figure. 425 Establishing the IEEE 802.11 association" and "11.3 STA authentication and association", 7 Dec. 2016

SUMMARY OF INVENTION

Technical Problem

An object is to improve communication stability during the multi-link.

Means for Solution to Problem

A base station of an embodiment includes a first wireless signal processing unit, a second wireless signal processing unit, and a link management unit. The first wireless signal processing unit is configured to be able to transmit and receive a wireless signal using a first channel. The second wireless signal processing unit is configured to be able to transmit and receive a wireless signal using a second channel that is different from the first channel. The link management unit establishes a multi-link with the terminal apparatus by using the first wireless signal processing unit and the second wireless signal processing unit, and sets a primary link used as a main in the multi-link and a secondary link used as an auxiliary. The link management unit transmits a first wireless frame requesting a change of the primary link to the terminal apparatus by using the first wireless signal processing unit set to the primary link, and changes the primary link from the first wireless signal processing unit to the second wireless signal processing unit if either the first wireless signal processing unit or the second wireless signal processing unit receives an affirmative response from the terminal apparatus after the first wireless frame is transmitted.

Advantageous Effects of Invention

The base station of the embodiment can improve communication stability during the multi-link.

BRIEF DESCRIPTION OF DRAWINGS

FIG. 9 is a table showing an example of link management information in the wireless system according to the first embodiment.

FIG. 13 is a table showing an example of a change in link management information due to the primary change processing described with reference to FIG. 12.

FIG. 17 is a table showing an example of a change in link management information due to an example of use of the multi-link power save described with reference to FIG. 16.

FIG. 19 is a table showing an example of a change in link management information due to the primary change processing described with reference to FIG. 18.

FIG. 23 is a table showing an example of a change in link management information due to the channel change processing described with reference to FIG. 22.

DESCRIPTION OF EMBODIMENTS

Figure 1:
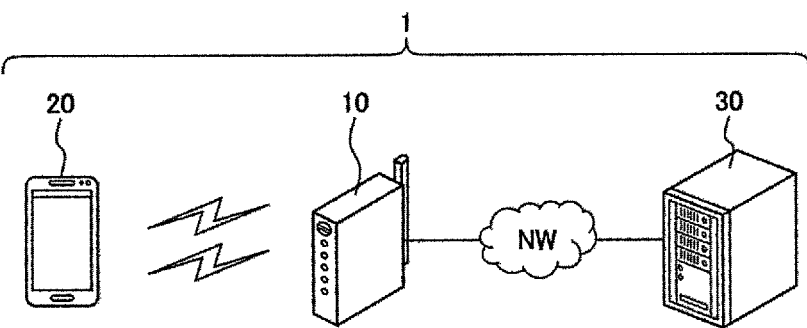
FIG. 1 is a conceptual diagram showing an example of an overall configuration of a wireless system according to a first embodiment.

Hereinafter, embodiments will be described with reference to the drawings. Each embodiment illustrates a device or a method for embodying the technical idea of the invention. The drawings are schematic or conceptual. The dimensions, ratios, and the like of each of the drawings are not always the same as the actual ones. The technical idea of the present invention is not specified by the shape, structure, arrangement, and the like of the constituent elements. In the following description, constituent elements having substantially the same function and configuration are denoted by the same reference numerals.

<1> First Embodiment

A wireless system 1 according to a first embodiment relates to a method of switching a primary link set by a multi-link. The wireless system 1 according to the first embodiment will be described below.
<1-1> Configuration of Wireless System 1
<1-1-1> Regarding Overall Configuration of Wireless System 1
FIG. 1 shows an example of a configuration of the wireless system 1 according to the first embodiment. As shown in FIG. 1, the wireless system 1 includes, for example, a base station 10, a terminal apparatus 20, and a server 30.

The base station 10 is connected to a network NW and is used as an access point of a wireless LAN. For example, the base station 10 can wirelessly distribute data received from the network NW to the terminal apparatus 20. Also, the base station 10 can be connected to the terminal apparatus 20 using one type of band or a plurality of types of bands. In the present specification, a wireless connection between the base station 10 and the terminal apparatus 20 using a plurality of types of bands is referred to as a "multi-link". Communication between the base station 10 and the terminal apparatus 20 is based on, for example, the IEEE 802.11 standard.

The terminal apparatus 20 is, for example, a wireless terminal apparatus such as a smartphone or a tablet PC. The terminal apparatus 20 can transmit and receive data to and from a server 30 on the network NW via the base station 10, which is connected wirelessly. Note that the terminal apparatus 20 may be another electronic device such as a desktop computer or a laptop computer. The terminal apparatus 20 may be a device that can communicate with at least the base station 10 and can perform operations which will be described later.

The server 30 can hold various types of information, and for example, holds data on content for the terminal apparatus 20. The server 30 is configured to be connected to, for example, the network NW by wire, and to be able to communicate with the base station 10 via the network NW. Note that the server 30 may be able to communicate with at least the base station 10. That is to say, communication between the base station 10 and the server 30 may be by wire or wirelessly.

In the wireless system 1 according to the first embodiment, the data communication between the base station 10 and the terminal apparatus 20 is based on an open systems interconnection (OSI) reference model. Communication functions in the OSI reference model are divided into seven layers (Layer 1: physical layer, Layer 2: data link layer, Layer 3: network layer, Layer 4: transport layer, Layer 5: session layer, Layer 6: presentation layer, Layer 7: application layer).

The data link layer includes, for example, a logical link control (LLC) layer and a media access control (MAC) layer. The LLC layer adds, for example, a destination service access point (DSAP) header and a source service access point (SSAP) header, and the like to data input from a higher-ordered application, thereby configuring LLC packets. The MAC layer adds a MAC header to, for example, an LLC packet to form a MAC frame.

Figure 2:
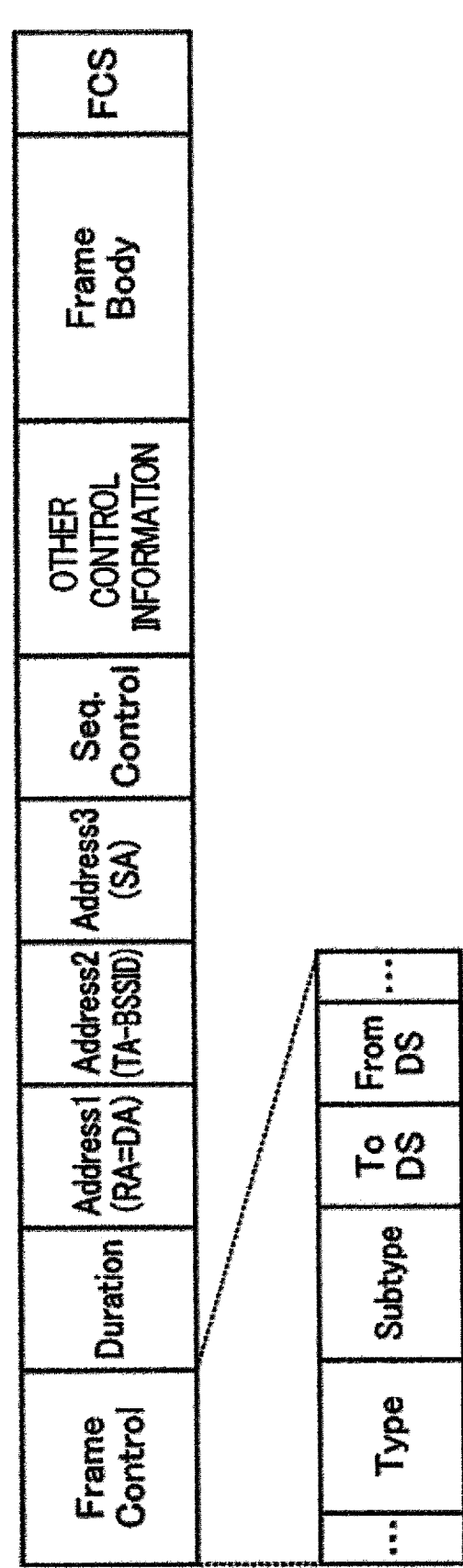
FIG. 2 is a conceptual diagram showing a specific example of a format of a wireless frame in the wireless system according to the first embodiment.

FIG. 2 shows a specific example of a format of a wireless frame used for communication between the base station 10 and the terminal apparatus 20 in the wireless system 1 according to the first embodiment. As shown in FIG. 2, the wireless frame includes, for example, a Frame Control field, a Duration field, an Address1 field, an Address2 field, an Address3 field, a Sequence Control field, another control information field, a Frame Body field, and an frame check sequence (FCS) field.

The Frame Control field to the other control information field correspond to, for example, a MAC header included in a MAC frame. The Frame Body field corresponds to, for example, a MAC payload contained in the MAC frame. The FCS field stores an error detection code of the MAC header and Frame Body field, and is used to determine whether or not there is an error in the wireless frame.

The Frame Control field indicates various types of control information and includes, for example, a Type value, a Subtype value, a To Distribution System (To DS) value, and a From DS value. The Type value indicates a frame type of the wireless frame. For example, the Type value "00" indicates that the wireless frame is a management frame. The Type value "01" indicates that the wireless frame is a control frame. The Type value "10" indicates that the wireless frame is a data frame.

The details of the wireless frame change depending on a combination of the Type value and the Subtype value. For example, "00/1000 (Type value/Subtype value)" indicates that the wireless frame is a beacon signal. The meanings of the To DS value and From DS value differ depending on a combination thereof. For example, "00 (To DS/From DS)" indicates that the data is between terminal apparatuses in the same independent basic service set (IBSS). "10" indicates that the data frame is directed to the distribution system (DS) from the outside. "01" indicates that the data frame is to go out of the DS. "11" is used when forming a mesh network.

The Duration field indicates a scheduled period of using a wireless line. A plurality of address fields indicate a BSSID, a transmission source address, a destination address, a sender terminal apparatus address, a receiver terminal apparatus address, and the like. The Sequence Control field shows a sequence number of the MAC frame and a fragment number for a fragment. The other control information fields include, for example, traffic type "TID" information. The TID information may be inserted at other positions in the wireless frame. The Frame Body field includes information corresponding to a type of the frame. For example, the Frame Body field stores data when it corresponds to a data frame.

<1-1-2> Regarding Configuration of Base Station 10

Figure 3:
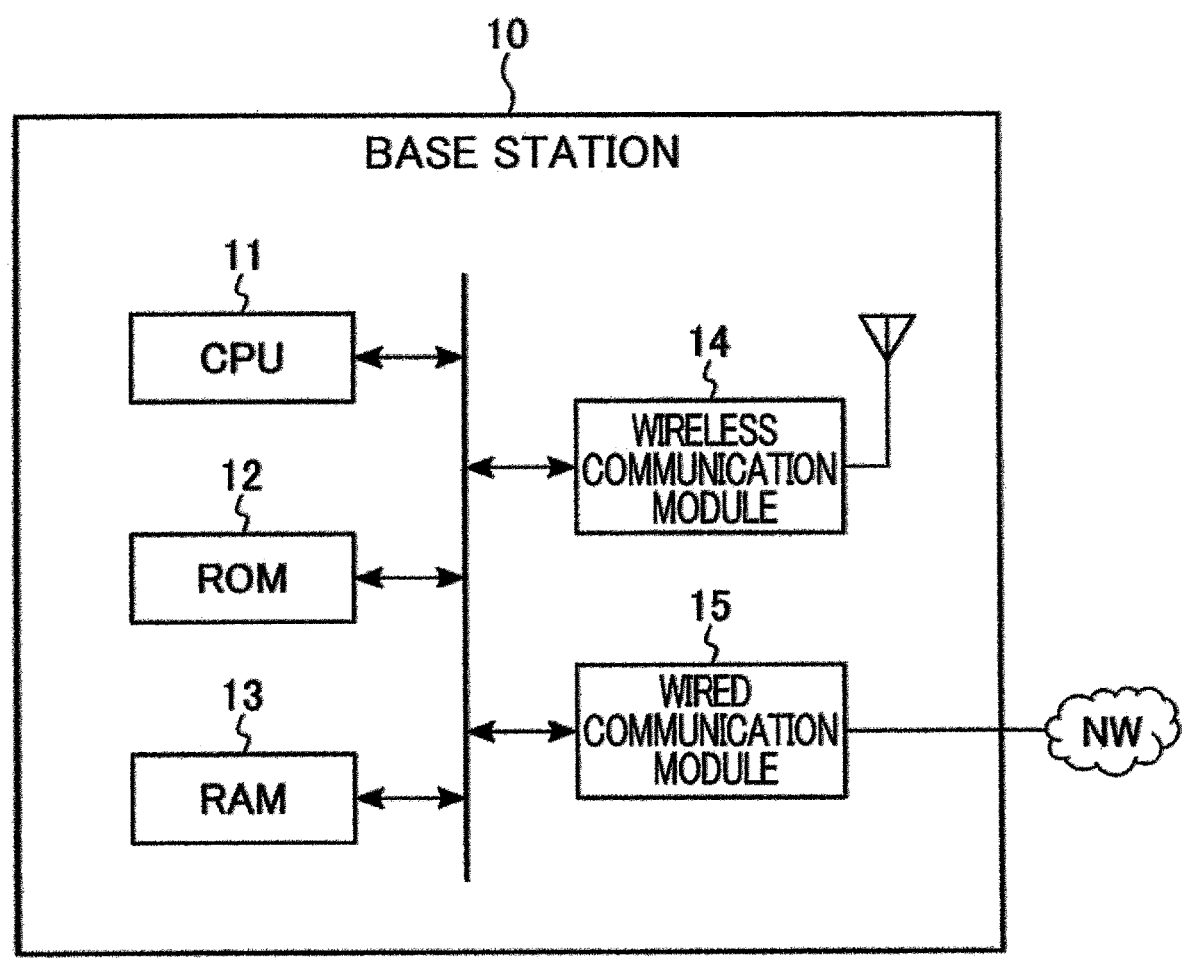
FIG. 3 is a block diagram showing an example of a configuration of a base station included in the wireless system according to the first embodiment.

FIG. 3 shows an example of a configuration of the base station 10 included in the wireless system 1 according to the first embodiment. As shown in FIG. 3, the base station 10 includes, for example, a central processing unit (CPU) 11, a read only memory (ROM) 12, a random access memory (RAM) 13, a wireless communication module 14, and a wired communication module 15.

The CPU 11 is a circuit which can execute various programs, and controls an overall operation of the base station 10. The ROM 12 is a non-volatile semiconductor memory, and holds a program, control data, and the like for controlling the base station 10. The RAM 13 is, for example, a volatile semiconductor memory and is used as a work region of the CPU 11. The wireless communication module 14 is a circuit used for transmitting and receiving data by a wireless signal, and is connected to an antenna. Also, the wireless communication module 14 includes, for example, a plurality of communication modules that respectively correspond to a plurality of frequency bands. The wired communication module 15 is a circuit used for transmitting and receiving data by a wired signal, and is connected to the network NW.

Figure 4:
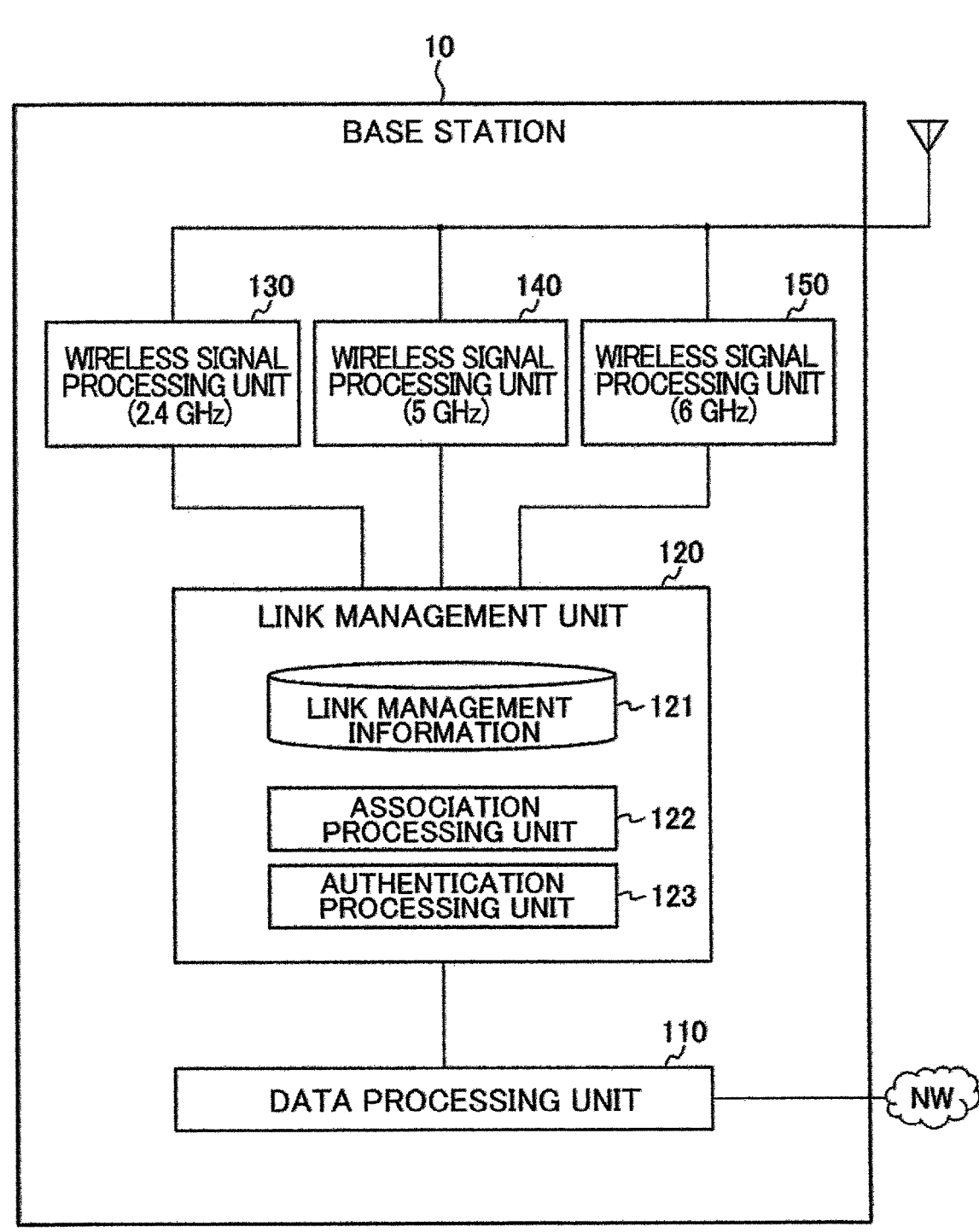
FIG. 4 is a block diagram showing an example of functions of the base station included in the wireless system according to the first embodiment.

FIG. 4 shows an example of a functional configuration of the base station 10 included in the wireless system 1 according to the first embodiment. As shown in FIG. 4, the base station 10 includes, for example, a data processing unit 110, a link management unit 120, and wireless signal processing units 130, 140, and 150. The processing of the data processing unit 110, the link management unit 120, and the wireless signal processing units 130, 140, and 150 is realized by, for example, the CPU 11 and the wireless communication module 14.

The data processing unit 110 can perform the processing of the LLC layer and the processing of the higher-ordered layers (third layer to seventh layer) on the input data. For example, the data processing unit 110 outputs the data input from the server 30 via the network NW to the link management unit 120. Also, the data processing unit 110 transmits the data input from the link management unit 120 to the server 30 via the network NW.

The link management unit 120 can perform, for example, some of the processing of the MAC layer on the input data. Also, the link management unit 120 manages a link with the terminal apparatus 20 on the basis of notifications from the wireless signal processing units 130, 140, and 150. The link management unit 120 includes link management information 121. The link management information 121 is stored in, for example, the RAM 13, and includes information on the terminal apparatus 20 which is wirelessly connected to the base station 10. Also, the link management unit 120 includes an association processing unit 122 and an authentication processing unit 123. When receiving a connection request of the terminal apparatus 20 via any one of the wireless signal processing units 130, 140, and 150, the association processing unit 122 performs a protocol relating to the association.

The authentication processing unit 123 performs a protocol relating to authentication following the connection request.

Each of the wireless signal processing units 130, 140, and 150 transmits/receives data between the base station 10 and the terminal apparatus 20 by using wireless communication. For example, each of the wireless signal processing units 130, 140, and 150 creates a wireless frame by adding a preamble, a PHY header, or the like to the data input from the link management unit 120. Furthermore, each of the wireless signal processing units 130, 140, and 150 converts the wireless frame into a wireless signal and distributes a wireless signal via an antenna of the base station 10. Also, each of the wireless signal processing units 130, 140, and 150 converts the wireless signal received via the antenna of the base station 10 into a wireless frame. In addition, each of the wireless signal processing units 130, 140, and 150 outputs the data included in the wireless frame to the link management unit 120.

In this way, each of the wireless signal processing units 130, 140, and 150 can perform, for example, a part of the processing of the MAC layer and the processing of the first layer on the input data or the wireless signal. For example, the wireless signal processing unit 130 handles wireless signals in a 2.4 GHz band. The wireless signal processing unit 140 handles wireless signals in a 5 GHz band. The wireless signal processing unit 150 handles wireless signals in a 6 GHz band. The wireless signal processing units 130, 140, and 150 may or may not share the antenna of the base station 10.

<1-1-3> Regarding Configuration of Terminal Apparatus 20

Figure 5:
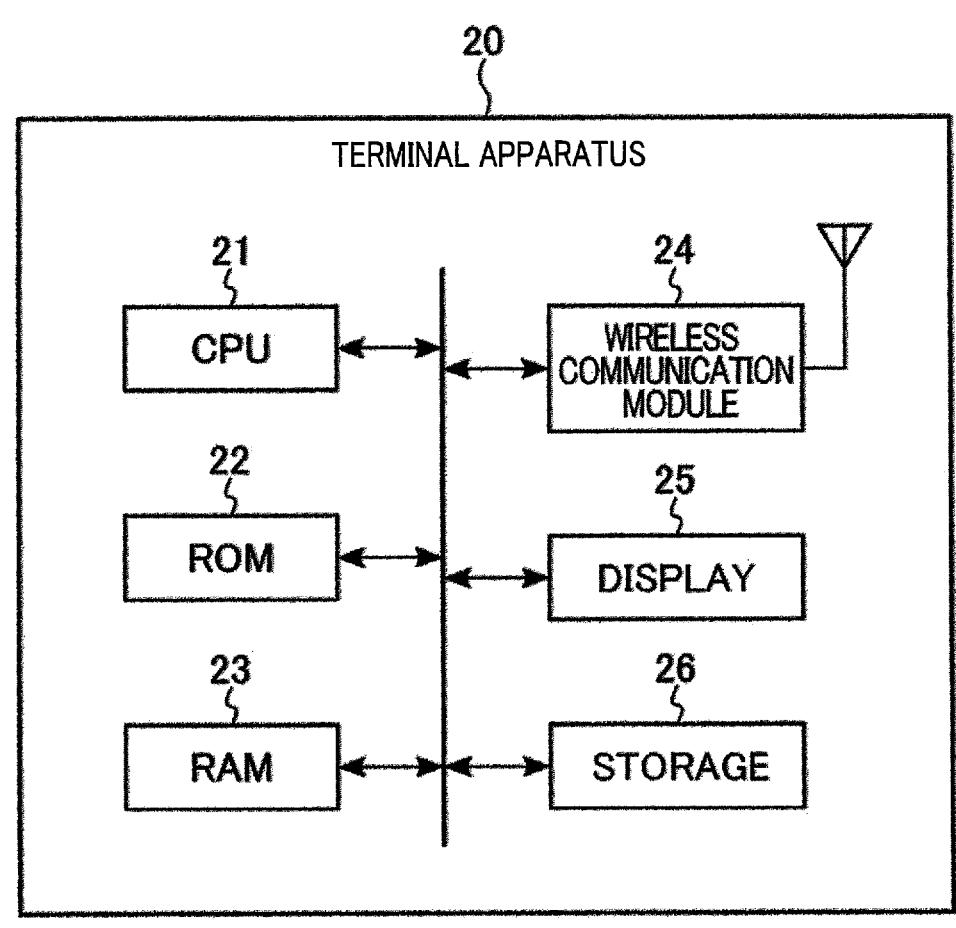
FIG. 5 is a block diagram showing an example of a configuration of a terminal apparatus included in the wireless system according to the first embodiment.

FIG. 5 shows an example of a configuration of the terminal apparatus 20 included in the wireless system 1 according to the first embodiment. As shown in FIG. 5, the terminal apparatus 20 includes, for example, a CPU 21, a ROM 22, a RAM 23, a wireless communication module 24, a display 25, and a storage 26.

The CPU 21 is a circuit which can execute various programs, and controls an overall operation of the terminal apparatus 20. The ROM 22 is a non-volatile semiconductor memory, and holds a program, control data, and the like for controlling the terminal apparatus 20. The RAM 23 is, for example, a volatile semiconductor memory and is used as a work region of the CPU 21. The wireless communication module 24 is a circuit used for transmitting and receiving data by a wireless signal, and is connected to an antenna. Also, the wireless communication module 24 includes, for example, a plurality of communication modules which respectively correspond to a plurality of frequency bands. The display 25 displays, for example, a graphical user interface (GUI) corresponding to application software. The display 25 may have a function of an input interface of the terminal apparatus 20. The storage 26 is a non-volatile storage device, and holds, for example, system software and the like of the terminal apparatus 20. Note that the terminal apparatus 20 may not have a display. For example, the display 25 can be omitted in an IoT terminal apparatus.

Figure 6:
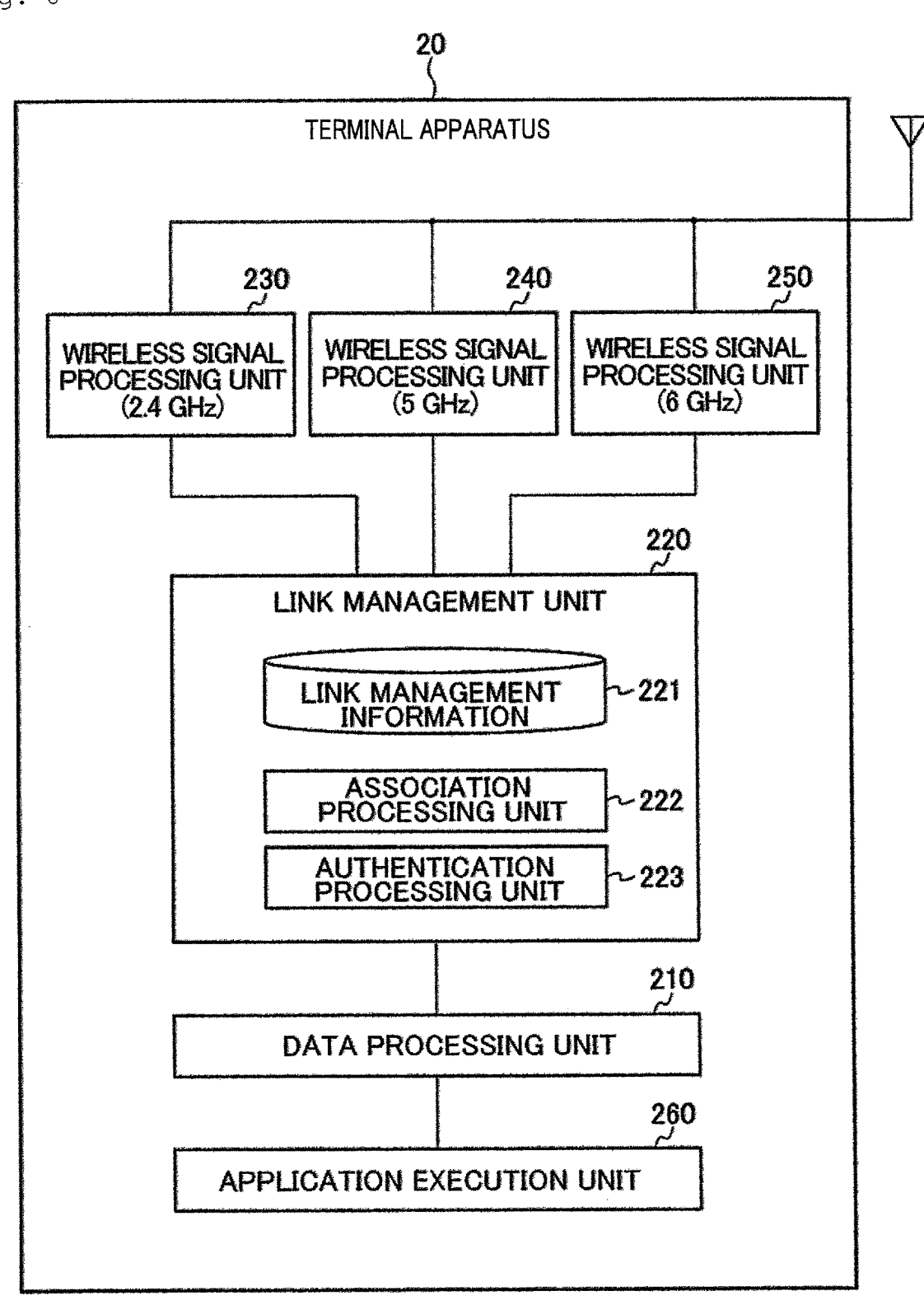
FIG. 6 is a block diagram showing an example of functions of the terminal apparatus included in the wireless system according to the first embodiment.

FIG. 6 shows an example of a functional configuration of the terminal apparatus 20 included in the wireless system 1 according to the first embodiment. As shown in FIG. 6, the terminal apparatus 20 includes, for example, a data processing unit 210, a link management unit 220, wireless signal processing units 230, 240, and 250, and an application execution unit 260. The processing of the data processing unit 210, the link management unit 220, and the wireless signal processing units 230, 240, and 250 is realized by, for example, the CPU 21 and the wireless communication module 24.

The data processing unit 210 can perform the processing of the LLC layer and the processing of the higher-ordered layer (third layer to seventh layer) on the input data. For example, the data processing unit 210 outputs the data input from the application execution unit 260 to the link management unit 220. Also, the data processing unit 210 outputs the data input from the link management unit 220 to the application execution unit 260.

The link management unit 220 can perform, for example, some of the processing of the MAC layer on the input data. Also, the link management unit 220 manages a link with the base station 10 on the basis of notifications from the wireless signal processing units 230, 240, and 250. The link management unit 220 includes link management information 221. The link management information 221 is stored in, for example, the RAM 23, and includes information on the base station 10 wirelessly connected to the terminal apparatus 20. Also, the link management unit 220 includes an association processing unit 222 and an authentication processing unit 223. When receiving the connection request of the base station 10 via any one of the wireless signal processing units 230, 240, and 250, the association processing unit 222 performs a protocol relating to association. The authentication processing unit 223 performs a protocol relating to authentication following the connection request.

That is to say, each of the wireless signal processing units 230, 240, and 250 performs transmission and reception of data between the base station 10 and the terminal apparatus 20 using wireless communication. For example, each of the wireless signal processing units 230, 240, and 250 creates a wireless frame by adding a preamble, a PHY header, or the like to the data input from the link management unit 220. Furthermore, each of the wireless signal processing units 230, 240, and 250 converts the wireless frame into a wireless signal and distributes the wireless signal via the antenna of the terminal apparatus 20. Also, each of the wireless signal processing units 230, 240, and 250 converts the wireless signal received via the antenna of the terminal apparatus 20 into a wireless frame. Furthermore, each of the wireless signal processing units 230, 240, and 250 outputs the data included in the wireless frame to the link management unit 220.

In this way, each of the wireless signal processing units 230, 240, and 250 can perform, for example, a part of the processing of the MAC layer and the processing of the first layer on the input data or the wireless signal. For example, the wireless signal processing unit 230 handles wireless signals in a 2.4 GHz band. The wireless signal processing unit 240 handles wireless signals in a 5 GHz band. The wireless signal processing unit 250 handles wireless signals in a 6 GHz band. The wireless signal processing units 230, 240, and 250 may or may not share the antenna of the terminal apparatus 20.

The application execution unit 260 performs an application which can use the data input from the data processing unit 210. For example, the application execution unit 260 can display information on the application on the display 25. Also, the application execution unit 260 can operate on the basis of an operation of an input interface.

In the wireless system 1 according to the first embodiment described above, each of the wireless signal processing units 130, 140, and 150 of the base station 10 is configured to be able to connect to the wireless signal processing units 230, 240, and 250 of the terminal apparatus 20. That is to say, the wireless signal processing units 130 and 230 can be wirelessly connected using the 2.4 GHz band. The wireless signal processing units 140 and 240 can be wirelessly connected using the 5 GHz band. The wireless signal processing units 150 and 250 can be wirelessly connected using the 6 GHz band. In the present specification, each wireless signal processing unit may be referred to as a "STA function". That is to say, the wireless system 1 according to the embodiment includes a plurality of STA functions.

<1-1-4> Regarding Detailed Configuration of Link Management Unit

Figure 7:
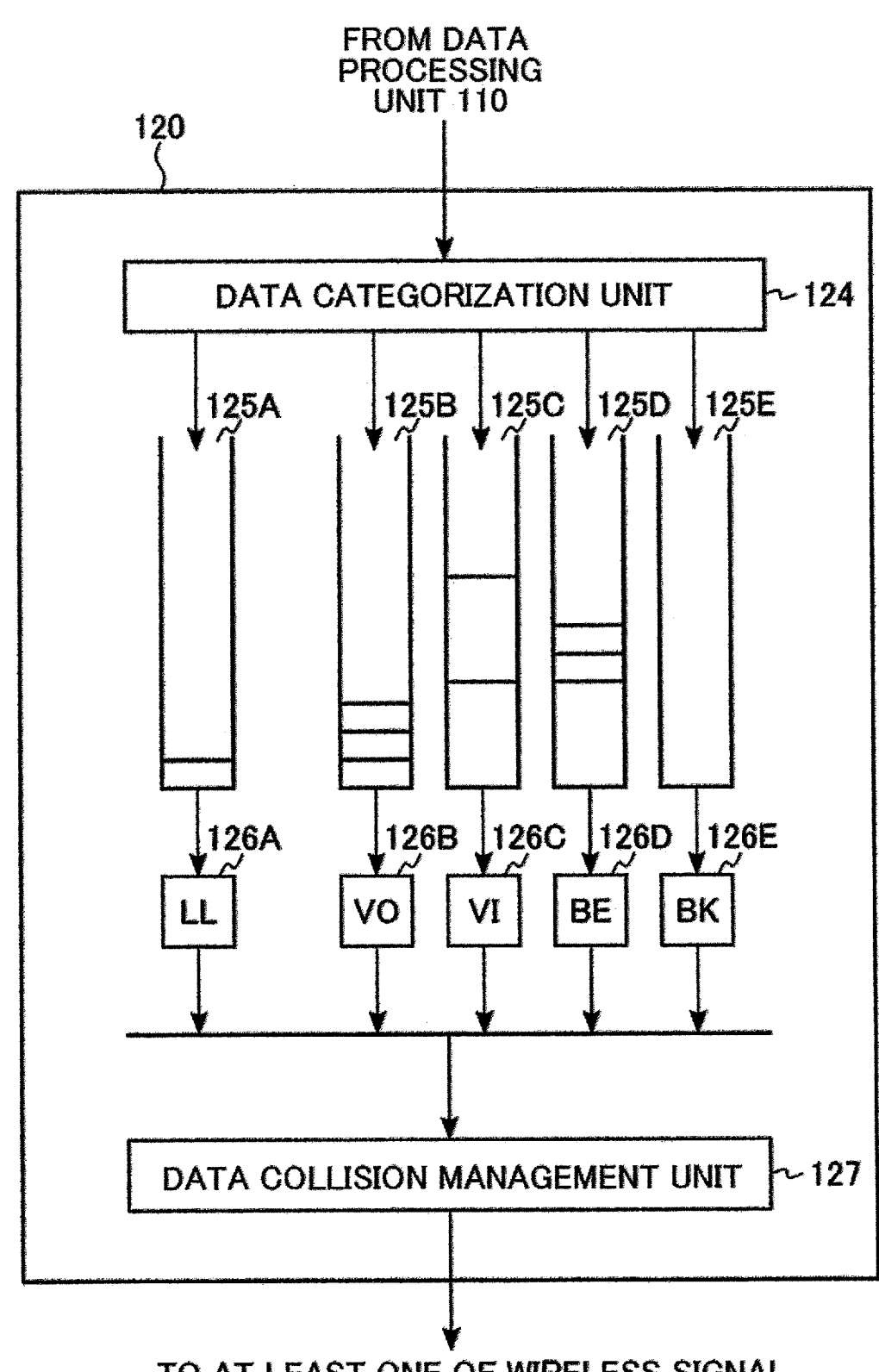
FIG. 7 is a block diagram showing an example of a detailed function of a link management unit of the base station included in the wireless system according to the first embodiment.

FIG. 7 shows the details of a channel access function in the link management unit 120 of the base station 10 included in the wireless system 1 according to the first embodiment. Note that, since the function of the link management unit 220 of the terminal apparatus 20 is, for example, the same as that of the link management unit 120 of the base station 10, the description thereof will be omitted. As shown in FIG. 7, the link management unit 120 includes, for example, a data categorization unit 124, transmission queues 125A, 125B, 125C, 125D, and 125E, Carrier Sense Multiple Access with Collision Avoidance (CSMA/CA) execution unit 126A, 126B, 126C, 126D, and 126E, and a data collision management unit 127.

The data categorization unit 124 categorizes the data from the data processing unit 110. As the data category, for example, "low latency (LL)", "voice (VO)", "video (VI)", "best effort (BE)", and "background (BK)" are set. The LL is applied to data requiring a low delay. Therefore, it is preferable that the LL data be processed preferentially to any of VO, VI, BE, and BK data.

Also, the data categorization unit 124 inputs the categorized data to any of the transmission queues 125A, 125B, 125C, 125D, and 125E. Specifically, the data of the LL is inputted to the transmission queue 125A. The data of the VO is inputted to the transmission queue 125B. The data of the VI is inputted to the transmission queue 125C. The data of the BE is inputted to the transmission queue 125D. The data of the BK is inputted to the transmission queue 125E. Furthermore, the inputted data of each category are stored in any of the corresponding transmission queues 125A to 125E.

Each of the CSMA/CA execution units 126A, 126B, 126C, 126D, and 126E uses preset access parameters to wait for transmission by a specified time while confirming that the carrier sense does not transmit wireless signals using other terminal apparatuses or the like in the CSMA/CA. Furthermore, the CSMA/CA execution units 126A, 126B, 126C, 126D, and 126E extract data from transmission queues 125A, 125B, 125C, 125D, and 125E, respectively, and output the extracted data to at least one of the wireless signal processing units 130, 140 and 150 via a data collision management unit 127. Thus, a wireless signal including the data is transmitted by a wireless signal processing unit (STA function) in which a transmission right is acquired by a CSMA/CA.

The CSMA/CA execution unit 126A performs a CSMA/CA for data of the LL held in the transmission queue 125A. The CSMA/CA execution unit 126B performs a CSMA/CA for data of the VO held in the transmission queue 125B. The CSMA-CA execution unit 126C performs a CSMA/CA for data of the VI held in the transmission queue 125C. The CSMA/CA execution unit 126D performs a CSMA/CA for data of the BE held in the transmission queue 125D. The CSMA/CA execution unit 126E performs a CSMA/CA for data of the BK held in the transmission queue 125E.

Note that the access parameters are, for example, assigned such that transmission of wireless signals are in the order of the LL, the VO, the VI, the BE, and the BK. The access parameters include, for example, CWmin, CWmax, AIFS, and TXOPLimit. CWmin and CWmax indicate the minimum value and the maximum value of the contention window, which is the transmission waiting time for collision avoidance, respectively. An arbitration inter frame space (AIFS) indicates a fixed transmission waiting time set for each access category for collision avoidance control having a priority control function. TXOPLimit is an upper limit value of transmission opportunity (TXOP) corresponding to the occupation time of the channel. For example, in the transmission queue 125, the shorter the CWmin and CWmax, the easier it is to obtain the transmission right. The priority of the transmission queue 125 becomes higher as the AIFS becomes smaller. The amount of data transmitted with one transmission right increases as the value of TXOP Limit increases.

The data collision management unit 127 prevents data collisions when the plurality of CSMA/CA execution units 126 acquire transmission rights with the same STA function. Specifically, the data collision management unit 127 adjusts a transmission timing of data for which the transmission right has been acquired by the same STA function in different categories, and transmits data in a high priority category to the STA function. For example, the STA function for which transmission rights have been acquired by the CSMA/CA of the transmission queue 125A of the LL may be the same as the STA function for which transmission rights have been acquired the transmission right by the CSMA/CA of any of the other transmission queues 125B to 125E. In this case, the data collision management unit 127 preferentially transmits the data stored in the transmission queue 125A to the STA function. Similarly, in the other combinations of the transmission queue 125, the data is transmitted in the order based on the priority set in the category. Thus, collision between pieces of data to which transmission is assigned to the same STA function is prevented.

Although the form in which the link management unit implements the channel access function was described in this embodiment, each of the STA functions may implement the channel access function. When the link management unit implements a channel access function, each STA function detects a state (idle/busy) of a radio channel in a corresponding link, and the link management unit determines whether or not the data can be transmitted (which link is used for transmission or the like). On the other hand, when each STA function implements a channel access function, each STA function independently performs carrier sensing and transmits data. At this time, channel access when a plurality of links are simultaneously used may be performed by sharing access parameters through interaction between a plurality of STA functions, or may be performed by sharing access parameters by a link management unit. The base station 10 and the terminal apparatus 20 can simultaneously use a plurality of links by transmitting data on the basis of common access parameters between a plurality of STA functions.

<1-2> Operation of Wireless System 1

Examples of various operations associated with the multi-link processing in the wireless system 1 according to the first embodiment will be described below. In the following description, for the sake of simplifying the explanation, STA1 and STA2 of the base station 10 are also referred to as "access point AP". Transmission of the wireless signal to an access point AP by the STA 1 and the STA 2 of the terminal apparatus 20 corresponds to transmission of the wireless signal to the STA 1 and the STA 2 of the base station 10, respectively. When the STA1 and the STA2 are individually described, they indicate the STA function of the terminal apparatus 20.

<1-2-1> Regarding Multi-Link Processing

Figure 8:
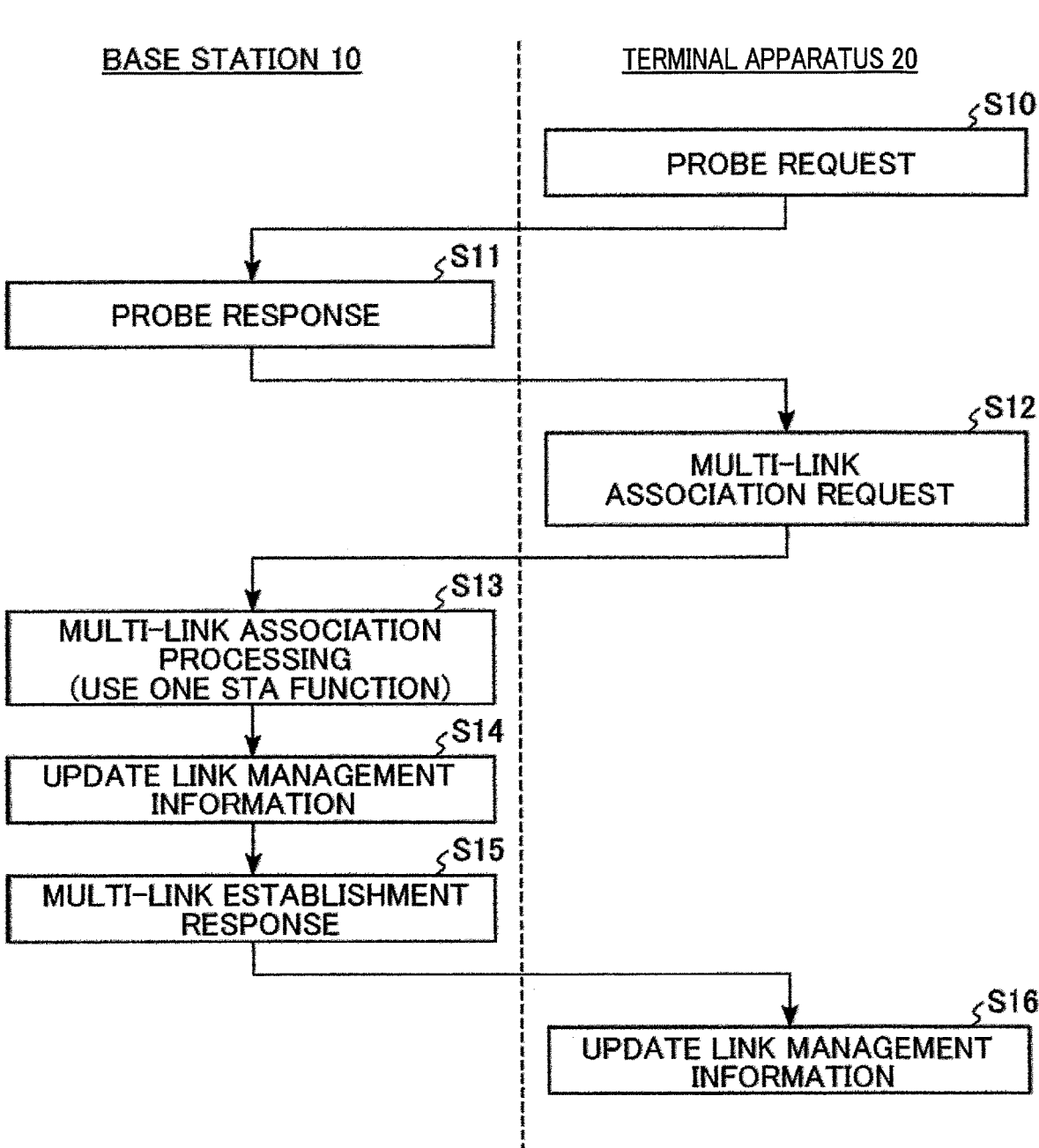
FIG. 8 is a flowchart for describing an example of multi-link processing in the wireless system according to the first embodiment.

FIG. 8 is a flowchart for describing an example of the multi-link processing in the wireless system 1 according to the first embodiment. As shown in FIG. 8, in the multi-link processing, for example, the processing of steps S10 to S16 is performed sequentially.

Specifically, first, in the processing of step S10, the terminal apparatus 20 transmits a probe request to the base station 10. The probe request is a signal for confirming whether or not the base station 10 is present in the vicinity of the terminal apparatus 20. The Frame Control field of the probe request includes, for example, "00/0100 (Type value/Subtype value)". Upon receiving the probe request, the base station 10 performs the processing of step S11.

In the processing of step S11, the base station 10 transmits a probe response to the terminal apparatus 20. The probe response is a signal used by the base station 10 to respond to a probe request from the terminal apparatus 20. The Frame Control field of the probe response includes, for example, "00/0101 (Type value/Subtype value)". Upon receiving the probe request, the terminal apparatus 20 performs the processing of step S12.

In the processing of step S12, the terminal apparatus 20 transmits a multi-link association request to the base station 10 via at least one STA function. The multi-link association request is a signal for requesting the base station 10 to establish a multi-link. For example, the multi-link association request is generated by the link management unit 220 of the terminal apparatus 20. The Frame Control field of the multi-link association request contains, for example, "00/xxxx (Type value/Subtype value (xxxx is a predetermined numerical value))". Upon receiving the multi-link association request, the link management unit 120 of the base station 10 performs the processing of step S13.

In the processing of step S13, the link management unit 120 of the base station 10 performs the multi-link association processing using one STA function. Specifically, first, the base station 10 performs the association processing of the first STA function with the terminal apparatus 20. Also, if the wireless connection (link) is established in the first STA function, the link management unit 120 of the base station 10 uses the first STA function for which the link is established to perform association processing of a second STA function. That is to say, the STA function with an established link is used for the association processing of the STA function with no established link. If the association processing of at least two STA functions is completed, the base station 10 establishes the multi-link and performs the processing of step S14.

Note that, if a link is established in the first STA function, a multi-link may be established. For example, each of the base station 10 and the terminal apparatus 20 collectively performs the association for the multi-link by providing notifications of the capability of the multi-link, a link that is a target of the multi-link, and an operation parameter in each link before association processing. Specifically, when the first STA function starts association, the link management units 120 and 220 instruct the establishment of a multi-link and designate a link or the like that is a target of the multi-link. Thus, the link management units 120 and 220 perform association of each link and manage these links as multi-links.

In the processing of step S14, the link management unit 120 of the base station 10 updates the link management information 121. Note that, although the processing of step S14 is performed after two links are established in this example, the link management information 121 may be updated each time the link state is updated or may be updated when the multi-link is established. If the multi-link is established and the link management information is updated, the base station 10 performs the processing of step S15.

In the processing of step S15, the base station 10 transmits a multi-link establishment response to the terminal apparatus 20. The multi-link establishment response is a signal used by the base station 10 to respond to a multi-link request from the terminal apparatus 20. The Frame Control field of the multi-link association request contains, for example, "00/0001 (Type value/Subtype value)". The link management unit 220 of the terminal apparatus 20 recognizes that the multi-link with the base station 10 has been established on the basis of the fact that the multi-link establishment response was received. Upon receiving the multi-link establishment response, the terminal apparatus 20 performs the processing of step S16.

In the processing of step S16, the link management unit 220 of the terminal apparatus 20 updates the link management information 221. That is to say, the terminal apparatus 20 records the fact that the multi-link with the base station 10 has been established in the link management information 221. As a result, the multi-link processing in the wireless system 1 according to the first embodiment is completed, and data communication using the multi-link becomes possible between the base station 10 and the terminal apparatus 20.

FIG. 9 shows an example of the link management information 121 in the wireless system 1 according to the first embodiment. Note that, since the link management information 221 of the terminal apparatus 20 has information similar to the link management information 121 of the base station 10, description thereof is omitted. As shown in FIG. 9, the link management information 121 includes, for example, information on an STA function, a frequency band, a link destination ID, presence/absence of a multi-link, and a TID.

In this example, "STA1" corresponds to the STA function which uses the frequency band of 6 GHz, that is, the wireless signal processing unit 150 or 250. "STA2" corresponds to the STA function which uses the frequency band of 5 GHz, that is, the wireless signal processing unit 140 or 240. "STA3" corresponds to the STA function using the frequency band of 2.4 GHz, that is, the wireless signal processing unit 130 or 230.

The link destination ID corresponds to the identifier of the terminal apparatus 20 in the link management information 121, and corresponds to an identifier of the base station 10 in the link management information 221. In this example, a multi-link using the "STA1" and the "STA2" has been established. If the multi-link is established, each of the link management units 120 and 220 transmits the data input from the higher-ordered layer using the link of at least one STA function associated with the multi-link. Furthermore, the STA1 is set as a primary link, and the STA2 is set as a secondary link.

The primary link is a link used as a main among multi-links. The secondary link is a link for auxiliary use in the multi-link. The links constituting the multi-link are assigned to either the primary link or the secondary link. There may be two or more primary links and secondary links. For each terminal apparatus 10 establishing a multi-link with the base station 10, link sets constituting each multi-link may be different from each other, and primary links may be different from each other. By allowing different primary links, an optimal link between the base station 10 and each terminal apparatus 20 can be set as a primary link. Thus, effects such as improvement in the quality of wireless communication are expected.

Furthermore, the primary link is used for transmission and reception of control information relating to the operation of the multi-link in addition to transmission and reception of assigned data. The primary link is preset, for example, when a multi-link is established between the base station 10 and the terminal apparatus 20. The STA function used as the primary link may be set in priority in accordance with the frequency band or may be set in accordance with the radio wave intensity of the link. Further, the setting of the primary link may be changed as appropriate after the establishment of the multi-link by a primary change processing which will be described later.

The "TID" in the link management information 121 indicates the association between the STA function and the TID information. Each STA function transmits and receives data corresponding to the assigned TID information. For example, TIDs #1 to #3 correspond to any one of LL, VO, VI, BE, and BK. One STA function may be associated with one traffic, that is, one TID information, or a plurality of STA functions may be associated with each other. In this example, the TID #1 is assigned to both of the STA1 and the STA2. The TID #2 is assigned to the STA1. The TID #3 is assigned to the STA2.

The traffic flow corresponding to the association between the traffic and the STA function is preset at the time of setting up the multi-link between the base station 10 and the terminal apparatus 20. For example, the link management unit 220 of the terminal apparatus 20 determines the association between the traffic and the STA function, and sends a request to the link management unit 120 of the base station 10. In addition, when the base station 10 responds to the request, the association between the traffic and the STA function is determined.

Note that the traffic is set to be uniform among a plurality of links constituting, for example, a multi-link. The present invention is not limited to this, similar types of traffic (priority/non-priority or the like) may be collected in one of the links constituting the multi-link. Furthermore, as the association between the STA function and the traffic, for example, an audio is associated with a frequency band of 2.4 GHz and a video is associated with 5 G. In this way, it is preferable that the frequency used for transmission/reception be assigned in accordance with the type of information to be handled and the amount of data.

<1-2-2> Regarding Data Transfer During the Multi-Link

Figure 10:
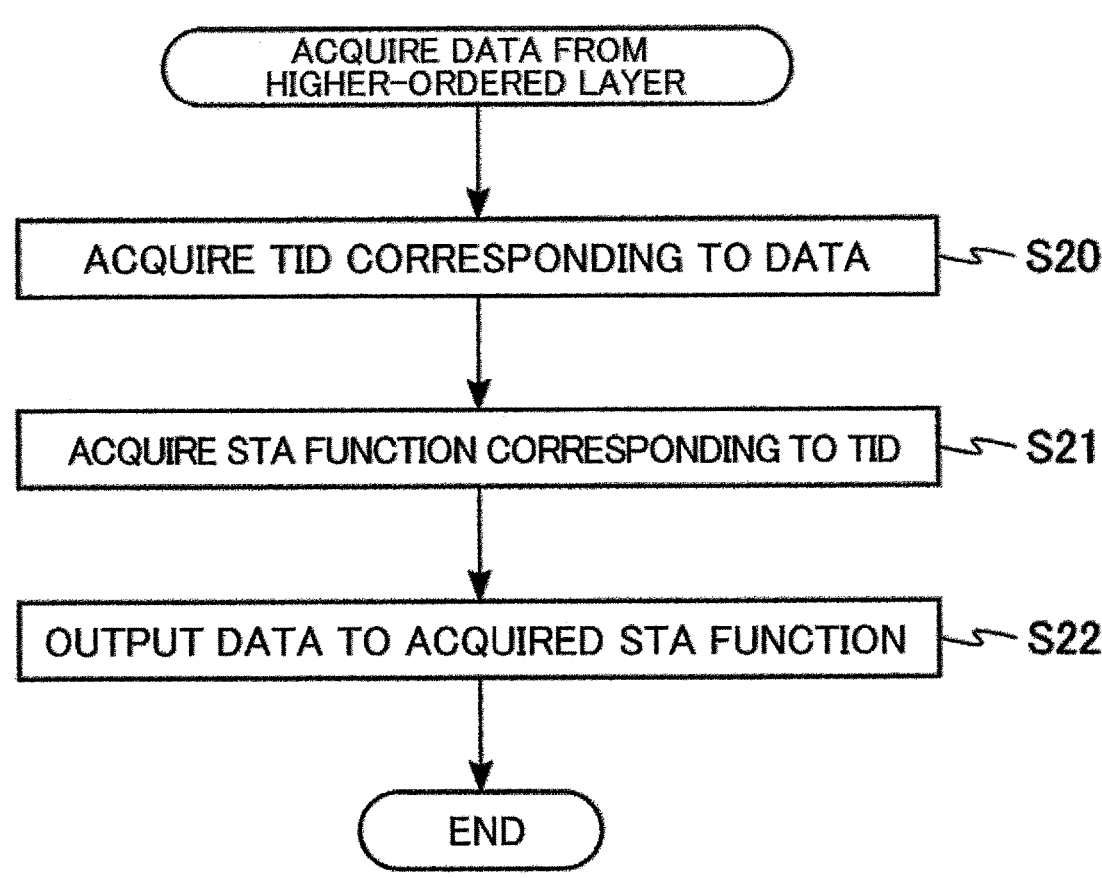
FIG. 10 is a flowchart for describing an example of a data transmission method at the time of multi-link in the wireless system according to the first embodiment.

FIG. 10 shows an example of a data transmission method during the multi-link in the base station 10 included in the wireless system 1 according to the first embodiment. As shown in FIG. 10, the base station 10 sequentially executes processing of steps S20 to S22 if acquiring data from an higher-ordered layer.

Specifically, first, in the processing of step S20, the link management unit 120 acquires TID information corresponding to the data. In other words, the link management unit 120 refers to, for example, a MAC header in a wireless frame acquired from an higher-ordered layer and determines whether or not the TID information included in the MAC header is LL, VO, VI, BE, or BK. Thus, the link management unit 120 can confirm the TID corresponding to the traffic flow of the data.

Subsequently, in the processing of step S21, the link management unit 120 acquires an STA function corresponding to the confirmed TID information. At this time, the link management unit 120 confirms the association between the TID information and the STA function by referring to the link management information 121. Note that, in the processing of step S21, the number of STA functions acquired by the link management unit 120 may be one or a plurality of STA functions.

Subsequently, in the processing of step S22, the link management unit 120 outputs data to the acquired STA function. When one STA function is associated with the output data (traffic), the data is serially transmitted using one STA function. On the other hand, when a plurality of STA functions are associated with the traffic, the data is transmitted in parallel by using the plurality of STA functions.

Note that, when one traffic is transmitted in parallel, data distribution and sorting are performed between the link management unit 120 of the base station 10 and the link management unit 220 of the terminal apparatus 20. The data distribution is performed by the link management unit on the transmitting side, and the sorting of the data is performed by the link management unit on the receiving side. For example, the link management unit on the transmitting side adds a flag indicating multi-link and an identification number to the wireless frame. The link management unit on the reception side performs rearrangement of data on the basis of the added flag and the identification number.

Furthermore, in the wireless system 1 according to the first embodiment, when receiving a plurality of data from an higher-ordered layer, the link management unit may perform aggregation by combining the plurality of pieces of received data. Aggregation in the multi-link may be used as an option function in which the presence or absence of execution can be selected by a user.

<1-2-3> Regarding Primary Change Processing

Figure 11:
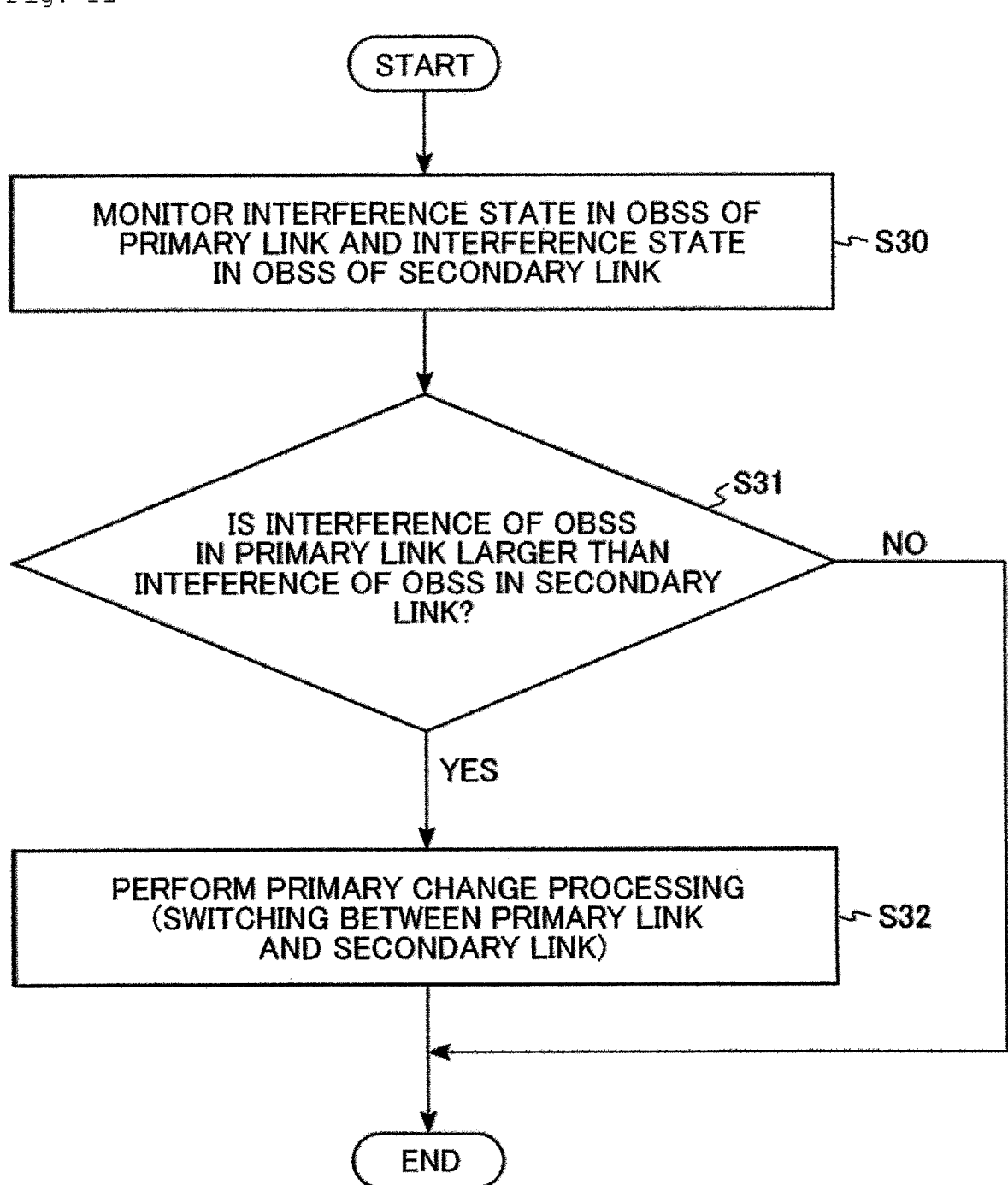
FIG. 11 is a flowchart for describing an example of execution conditions of primary change processing in the wireless system according to the first embodiment.

First, an example of conditions under which the primary change processing is executed will be described. FIG. 11 is a flowchart for describing an example of execution conditions of primary change processing in the wireless system 1 according to the first embodiment. As shown in FIG. 11, first, the link management unit 120 monitors an interference state of an overlapping BSS (OBSS) in the primary link and an interference state of an OBSS in the secondary link (step S30).

Moreover, the link management unit 120 confirms whether or not the interference of the OBSS in the primary link is larger than the interference of the OBSS in the secondary link (step S31). For example, the link management unit 120 confirms whether or not a channel occupancy time of the OBSS for the primary link is larger than a channel occupancy time of the OBSS for the secondary link. Note that, in the evaluation of the interference, a time other than the channel occupancy time may be used, and at least a factor for setting the channel to the busy state in a period other than the exchange of the signal of the self BSS may be used. For example, in the evaluation of interference, the magnitude of interference power, interference from other communication systems, the presence of noise power, and the like may be used.

The link management unit 120 performs the primary change processing (step S32) when the interference of the OBSS in the primary link is larger than the interference of the OBSS in the secondary link (step S31, YES). When the primary change processing is performed, the primary link is changed to another link used in the multi-link. That is to say, the switching is performed between the primary link and one secondary link.

When the interference of the OBSS in the primary link is equal to or less than the interference of the OBSS in the secondary link (step S31, NO) or when the primary change processing in step S32 is completed, the link management unit 120 ends a series of processes relating to the execution of the primary change processing. The link management unit 120 can periodically perform the processing of steps S30 to S32 described above.

Note that the primary change processing may be appropriately performed on the basis of a continuous monitoring result of the interference state of the OBSS. Furthermore, the trigger at which the primary change processing is performed is not limited to the interference state of OBSS. The primary change processing may be performed on the basis of the radio wave intensity of each link. In this case, the link management unit 120 confirms, for example, whether or not the radio wave intensity of the primary link is weaker than the radio wave intensity of the secondary link.

Figure 12:
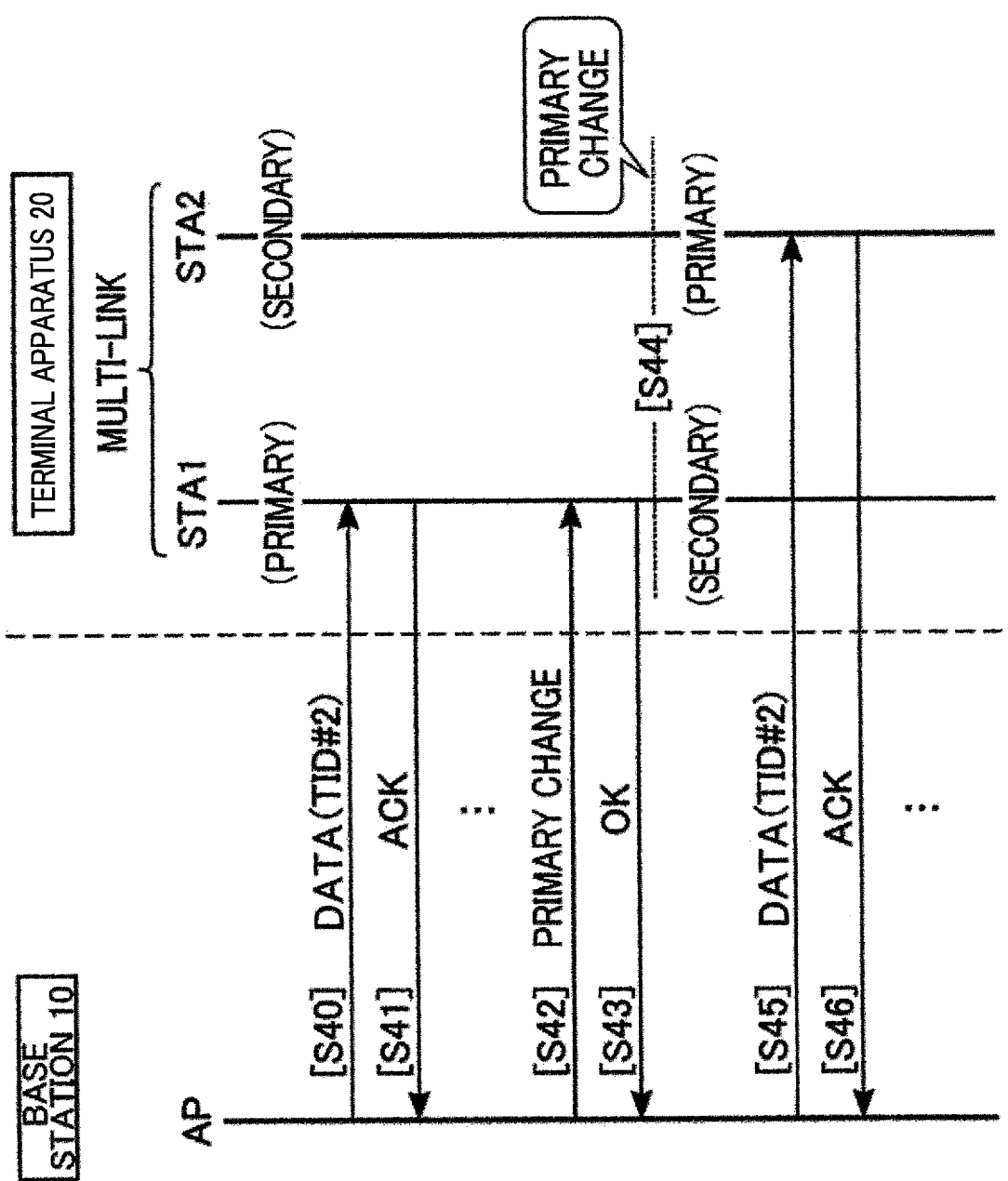
FIG. 12 is a flowchart for describing a specific example of the primary change processing in the wireless system according to the first embodiment.

Subsequently, a specific example of the primary change processing will be described with reference to FIG. 12. FIG. 12 is a flowchart for describing a specific example of the primary change processing in the wireless system 1 according to the first embodiment. Note that, in the initial state of this example, the link state shown in FIG. 9 is set. Also, the STA1 and the STA2 are set to the primary link and the secondary link, respectively.

If the data of the TID #2 is transmitted from the access point AP to the terminal apparatus 20 in the link state shown in FIG. 9, the STA1 of the terminal apparatus 20 receives the data (step S40). Furthermore, the STA1 of the terminal apparatus 20 transmits a wireless signal ("acknowledge (ACK)" which provides a notification concerning that the data has been received to the access point AP (step S41).

If the link management unit 120 of the base station 10 detects that a predetermined condition as described with reference to FIG. 11 is satisfied, a wireless signal requesting a change of the primary link is transmitted to the terminal apparatus 20 using the primary link (STA1) (step S42). If the STA 1 of the terminal apparatus 20 receives the wireless signal, the link management unit 220 of the terminal apparatus 20 confirms whether or not the primary link can be changed.

Also, when the primary link can be changed, a link management unit 220 of the terminal apparatus 20 transmits an affirmative response ("OK") to the access point AP via the STA1 or the STA2 (step S43). Note that, when the change of the primary link is impossible, the link management unit 220 of the terminal apparatus 20 may transmit a negative response ("NO") to the access point AP via the STA1 or the STA2.

After the processing of step S43, each of the link management unit 120 of the base station 10 and the link management unit 220 of the terminal apparatus 20 changes the primary link from the STA1 to the STA2 (step S44). Specifically, the STA1 is changed from the primary link to the secondary link, and the STA2 is changed from the secondary link to the primary link.

After the change of the primary link in step S44 is executed, if the data of TID #2 is transmitted from the access point AP to the terminal apparatus 20, the STA2 of the terminal apparatus 20 receives the data (step S45). Furthermore, the STA2 of the terminal apparatus 20 transmits a wireless signal ("ACK") which provides a notification concerning that the data has been received to the access point AP (step S46).

FIG. 13 shows an example of a change in the link management information 121 due to the primary change processing described with reference to FIG. 12. As shown in FIG. 13, when the primary change processing is performed, the primary/secondary setting and the TID setting in the two links constituting the multi-link are switched.

Specifically, through the primary change processing, the STA1 is changed from the primary link to the secondary link, and the TID assigned to the STA1 is changed from TIDs #1 and #2 to TIDs #1 and #3. On the other hand, the STA2 is changed from the secondary link to the primary link, and the TID assigned to the STA2 is changed from TIDs #1 and #3 to TIDs #1 and #2.

As described above, the primary link set by the multi-link can be changed by the primary change processing performed on the basis of the fact that a predetermined condition is satisfied. Also, the TID associated with the primary link may be changed in conjunction with the change of the primary link. Note that the setting relating to the association between the traffic and the TID information may be maintained when the primary link is changed. That is to say, in the primary change processing, at least the STA function for transmitting and receiving multi-link control information may be switched to the STA function newly set for the primary link.

Figure 14:
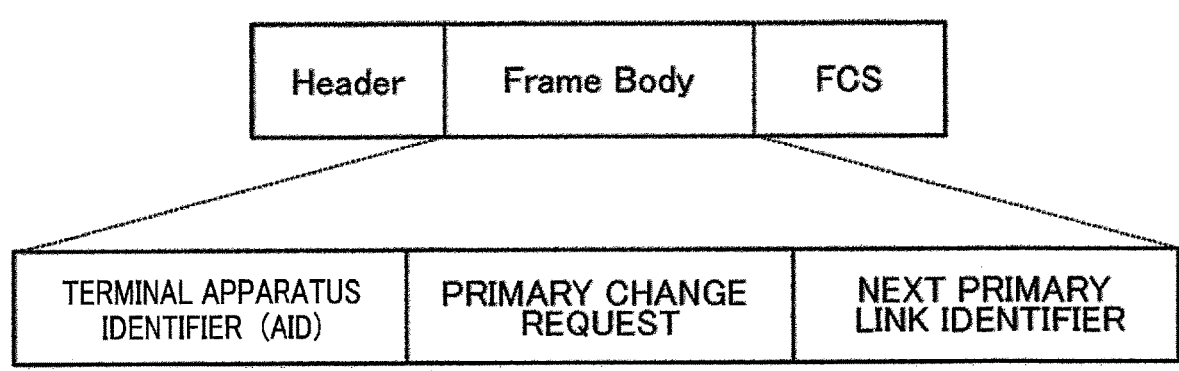
FIG. 14 is a conceptual diagram showing a specific example of a wireless frame used in the primary change processing of the wireless system according to the first embodiment.
Figure 15:
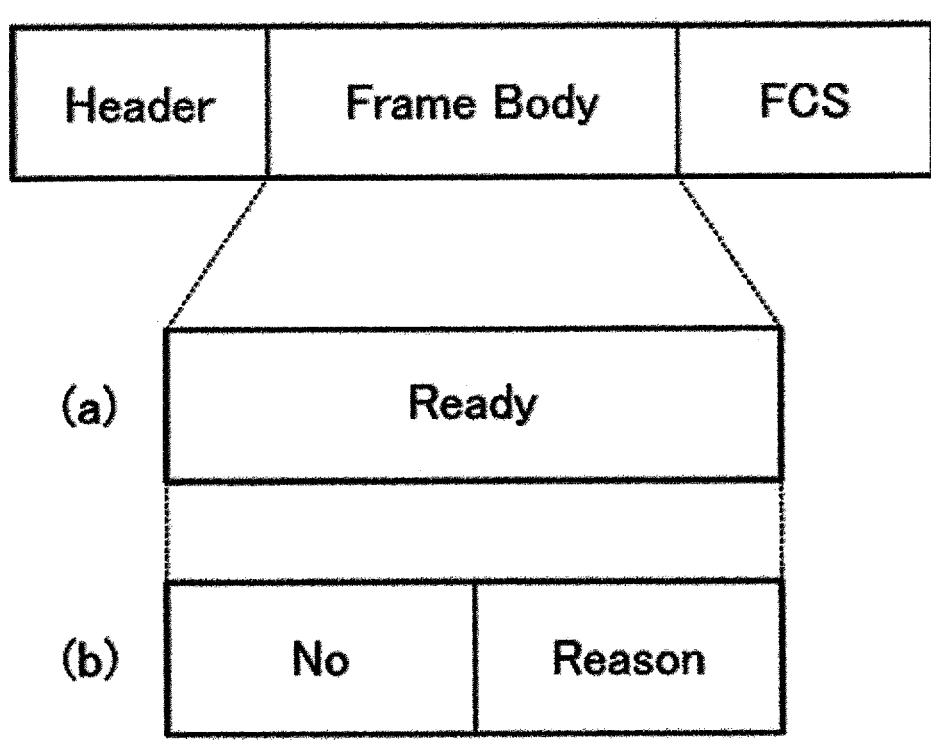
FIG. 15 is a conceptual diagram showing a specific example of a wireless frame used in the primary change processing of the wireless system according to the first embodiment.

FIGS. 14 and 15 show specific examples of the wireless frame used in the primary change processing of the wireless system 1 according to the first embodiment. FIG. 14 corresponds to a wireless frame to be transmitted when the access point AP requests the terminal apparatus 20 to change the primary link. FIG. 15 corresponds to a wireless frame in which the terminal apparatus 20 returns to the access point AP in response to a request to change the primary link.

As shown in FIG. 14, the Frame Body of the wireless frame requesting the change of the primary link includes, for example, a terminal apparatus identifier association identifier (AID), a primary change request, and an identifier of the next primary link. The link management unit 220 of the terminal apparatus 20 corresponding to the AID refers to the "identifier of the next primary link" on the basis of the "primary change request" and determines whether or not the primary link can be changed.

When the primary link can be changed, the Frame Body of the wireless frame corresponding to the response to the primary change request, that is, the affirmative response, includes "Ready" as shown in FIG. 15(a). "Ready" corresponds to a bit which provides a notification concerning that the primary change is possible.

On the other hand, when changing the primary link is not possible, the Frame Body of the wireless frame corresponding to the response to the primary change request, that is, the negative response, includes "No" and "Reason" as shown in FIG. 15(b). "No" corresponds to a bit for providing a notification concerning that the primary change is not possible. "Reason" corresponds to a bit for providing a notification of the reason why the primary change is impossible. Note that the "Reason" in the wireless frame corresponding to the response to the primary change request may be omitted.

<1-3> Effects of First Embodiment

According to the wireless system 1 according to the first embodiment described above, the communication stability during the multi-link can be improved. The details of the effects of the wireless system 1 according to the embodiment will be described below.

A base station and a terminal apparatus using a wireless LAN may have a plurality of STA functions provided for each band to be used such as, for example, 2.4 GHz, 5 GHz, and 6 GHz. In such a wireless system, for example, a wireless connection is established by selecting one STA function from a plurality of STA functions, and data communication between a base station and a terminal apparatus is performed. At this time, in the wireless system, the unselected STA function is not used even if there is a base station corresponding to the band of the STA function.

On the other hand, the wireless system 1 according to the first embodiment utilizes a plurality of STA functions provided in each of the base station 10 and the terminal apparatus 20 to establish a multi-link between the base station 10 and the terminal apparatus 20. In data communication through a multi-link, a plurality of bands can be used together, and the functions of the wireless LAN device can be fully utilized. As a result, the wireless system 1 according to the embodiment can realize efficient communication and can improve the communication speed.

Furthermore, as an operation method of the multi-link, it is conceivable to set a primary link using information relating to the control of the multi-link for transmission and reception. By setting the primary link, the wireless system 1 can simplify the communication between the link management unit 120 of the base station 10 and the link management unit 220 of the terminal apparatus 20.

On the other hand, in the multi-link, there is a case in which communication stability differs for each link constituting the multi-link. For example, the interference state due to the OBSS and the intensity of the radio waves may vary depending on the frequency band being used. Therefore, when the primary link is set in the multi-link, the communication quality of the primary link may be lower than the communication quality of the secondary link. Since the primary link is used for controlling the entire multi-link, it is preferable to have higher communication quality than other links.

Therefore, the wireless system 1 according to the first embodiment switches between the primary link and the secondary link in accordance with the communication quality of each link used in the multi-link. For example, the link management unit 120 of the base station 10 monitors an interference state of each link constituting a multi-link. Furthermore, if the link management unit 120 detects that the "OBSS interference in the primary link is greater than the OBSS interference in the secondary link", the primary link and the secondary link are switched.

As described above, the communication quality of the primary link is maintained in a high state by appropriately changing the primary link on the basis of predetermined conditions. As a result, the wireless system 1 according to the first embodiment can also improve the multi-link stability. In other words, the wireless system 1 according to the first embodiment can improve the communication quality between the base station 10 and the terminal apparatus 20 during the multi-link.

<2> Second Embodiment

A wireless system 1 according to a second embodiment has, for example, the same configuration as that of the first embodiment. Also, the wireless system 1 according to the second embodiment appropriately sets the secondary link to a multi-link power save, and collectively executes the switching of the primary link and the switching of the multi-link power save in the primary change processing.

Differences between the wireless system 1 according to the second embodiment and that of the first embodiment will be described below <2-1> Operation of Wireless System 1

<2-1-1> Regarding Multi-Link Power Save

In the wireless system 1 according to the second embodiment, a plurality of types of operation modes are prepared for each STA function. The operation modes of the STA function include, for example, an active mode, an intermittent operation mode, and an operation pause mode. The active mode corresponds to a state in which the STA function of the terminal apparatus 20 maintains an Awake state, and thus the wireless signal can be transmitted and received at any time. The intermittent operation mode corresponds to a state in which the STA function of the terminal apparatus 20 repeats an Awake state and a Doze state, thereby intermittently operating. The operation pause mode corresponds to a state in which the STA function of the terminal apparatus 20 maintains a Doze state and thus transmission and reception of a wireless signal is impossible. The plurality of STA functions constituting the multilink include at least one a link of the active mode or the intermittent operation mode. Other links constituting the multi-link may be set to any of the active mode, the intermittent operation mode, and the operation pause mode.

Note that the Awake state corresponds to a state in which a wireless signal can be transmitted and received. The Dose state corresponds to a state in which a wireless signal cannot be transmitted and received. In the Doze state, the supply of power to the circuit relating to the STA function is appropriately cut off. Therefore, the power consumption of the STA function becomes smaller in the order of the active mode, the intermittent operation mode, and the operation pause mode. Note that although the base station 10 or the terminal apparatus 20 can be used for communication, there may be a link between them which is not included in the multi-link link set (Disabled link). In the following description, in order to simplify the description, a link in the active mode or the intermittent operation mode, that is, a link capable of communication, is referred to as a "STA function (link) in an Awake state". The link in the operation pause mode, that is, the link in the power saving state in which communication is impossible, is called the "STA function (link) in the DOSE state".

In the multi-link in the wireless system 1 according to the second embodiment, the STA function set in the primary link is set to, for example, either the active mode or the intermittent operation mode. On the other hand, the STA function set in the secondary link can be set in any of the active mode, the intermittent operation mode, and the operation pause mode. For example, the terminal apparatus 20 can operate in power saving by setting the secondary link to the operation pause mode during the multi-link. In the following description, the state of the multi-link in which the secondary link is set to the operation pause mode is referred to as "multilink power save". Note that, when the multi-link is established by the multi-link processing, the initial state of the Secondary link may be set to any of the active mode, the intermittent operation mode, and the operation pause mode.

Figure 16:
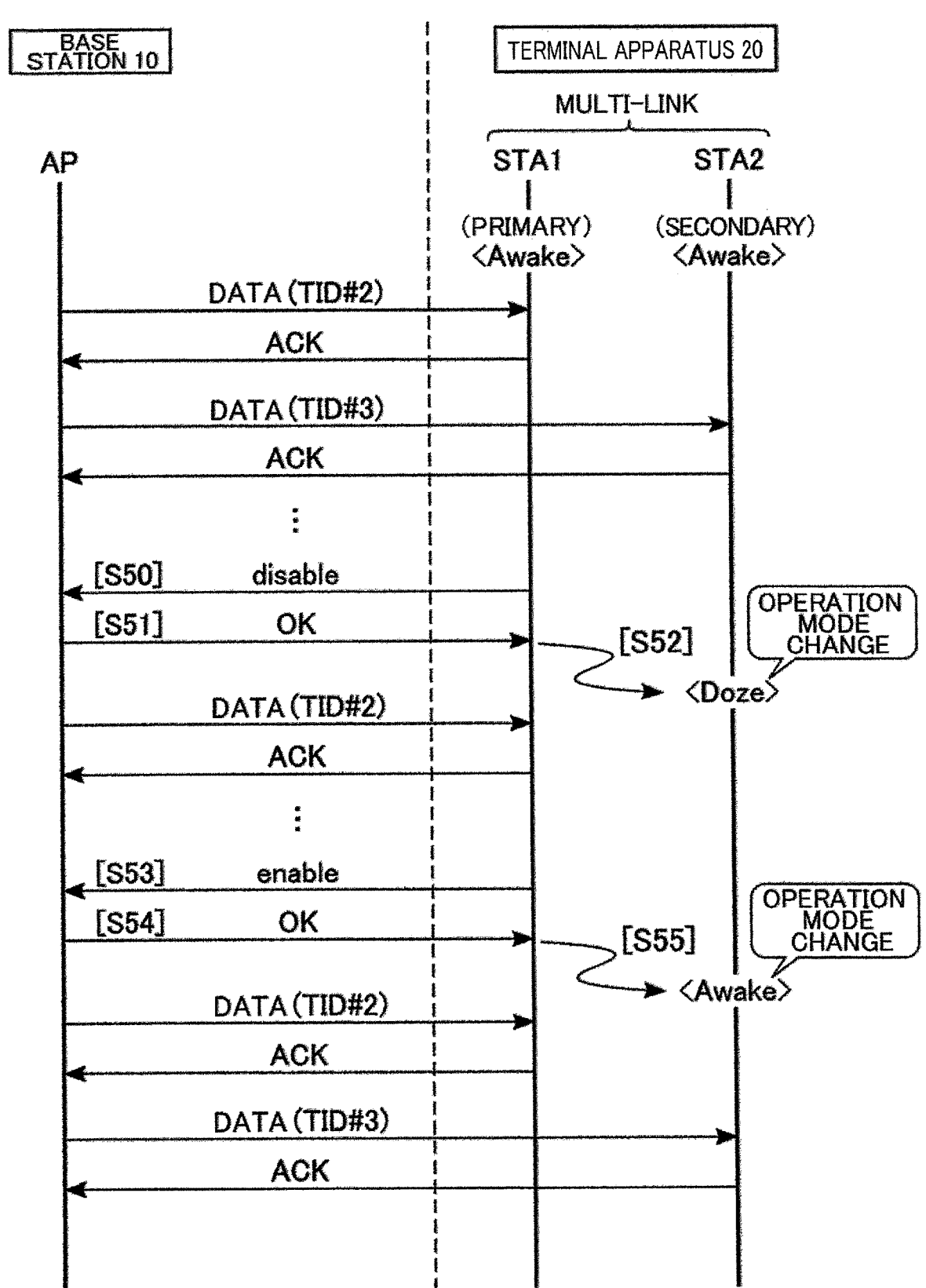
FIG. 16 is a flowchart for describing a specific example of a method of using a multi-link power save in a wireless system according to a second embodiment.

FIG. 16 shows an example of a method for using the multi-link power save in the wireless system 1 according to the second embodiment. Note that, in the initial state of this example, the link state shown in FIG. 9 is set. Also, each of the STA1 and the STA2 is set to the active mode. As shown in FIG. 16, when each of the STA1 and the STA2 is in the active mode, the data of TID #2 and the data of TID #3 can be transmitted and received together.

When the link management unit 220 of the terminal apparatus 20 detects that the first condition is satisfied, a Doze transition notification signal is transmitted to the access point AP using the primary link (STA1) (step S50). The first condition corresponds to, for example, that the traffic of the secondary link (STA2) is not accumulated. The Doze transition notification signal is a signal for notifying that the state transitions to the Doze state, and corresponds to the illustrated "disable". The terminal apparatus 20 can know the information of the traffic by receiving the beacon signal of the base station 10 by using at least one of the STA1 and the STA2.

If the STA 1 of the base station 10 receives a Doze transition notification signal, the link management unit 120 of the base station 10 confirms whether or not the secondary link can transition to the operation pause mode. Furthermore, when the transition of the secondary link to the operation pause mode can be permitted, the link management unit 120 of the base station 10 transmits an affirmative response ("OK") to the terminal apparatus 20 via the STA1 or the STA2 (step S51). Note that the link management unit 120 of the base station 10 may transmit a negative response ("NO") to the base station 10 via the STA1 or the STA2 when the transition to the operation pause mode of the secondary link cannot be permitted.

When the terminal apparatus 20 receives an affirmative response in step S51, a link management unit 220 of the terminal apparatus 20 changes the STA2 set as the secondary link to the operation pause mode (step S52). Thus, the STA1 and the STA2 of the terminal apparatus 20 are brought into the Awake state and the Doze state, respectively. At this time, the multi-link is in a state in which only the data of TID #2 can be transmitted/received.

After that, when the link management unit 220 of the terminal apparatus 20 detects that the second condition is satisfied, it transmits an Awake transition request signal to the access point AP using the primary link (STA1) (step S53). The second condition corresponds to, for example, the accumulation of the traffic of the secondary link (STA2). The Awake transition request signal is a signal requesting transition to the Awake state, and corresponds to the illustrated "enable". The terminal apparatus 20 can know the information of the traffic by receiving the beacon signal of the base station 10 by using the STA1 in the active state.

When the STA 1 of the base station 10 receives the Awake transition request signal, the link management unit 120 of the base station 10 transmits an affirmative response ("OK") to the terminal apparatus 20 via the STA1 corresponding to the primary link (step S54). When the terminal apparatus 20 receives an affirmative response in step S54, the link management unit 220 of the terminal apparatus 20 changes the STA2 set as the secondary link to the active mode (step S55). Thus, each of the STA1 and the STA2 of the terminal apparatus 20 is in the Awake state. As a result, the multi-link is in a state in which, for example, any data of TID #1 to #3 can be transmitted/received.

FIG. 17 shows an example of a change in the link management information 121 according to the example of use of the multi-link power save described with reference to FIG. 16. As shown in FIG. 17, the multi-link power saving is applied by the Doze transition notification signal and the Awaake transition request signal. Specifically, after the multi-link is set, the terminal apparatus 20 transmits the Doze transition notification signal to the base station 10 so that the secondary link in the active mode transitions to the operation pause mode, and transmits the Awake transition request signal, the secondary link in the operation pause mode transitions to the active mode.

In this way, in the wireless system 1 according to the second embodiment, the base station 10 and the terminal apparatus 20 can change the mode of the secondary link by transmitting the Awake transition request/Doze transition notification signal. The transmission of the Awake transition request signal is performed using the primary link or other activated links. The transmission of the Doze transition notification signal is performed by using the primary link or the link to stop (the link to the transition to the operation pause mode).

The Awake transition request signal and the Doze transition notification signal may be transmitted from either the access point AP or the terminal apparatus 20. When the first and second conditions are based on the retention of traffic (buffer state), the change of the operation mode is performed, for example, triggered by the traffic accumulated in the buffer exceeding a predetermined threshold value. In addition, the intermittent operation mode may be applied to the primary link. In this case, the primary link operates so that it can receive a beacon signal including at least multi-link control information.

<2-1-2> Regarding Primary Change Processing

Figure 18:
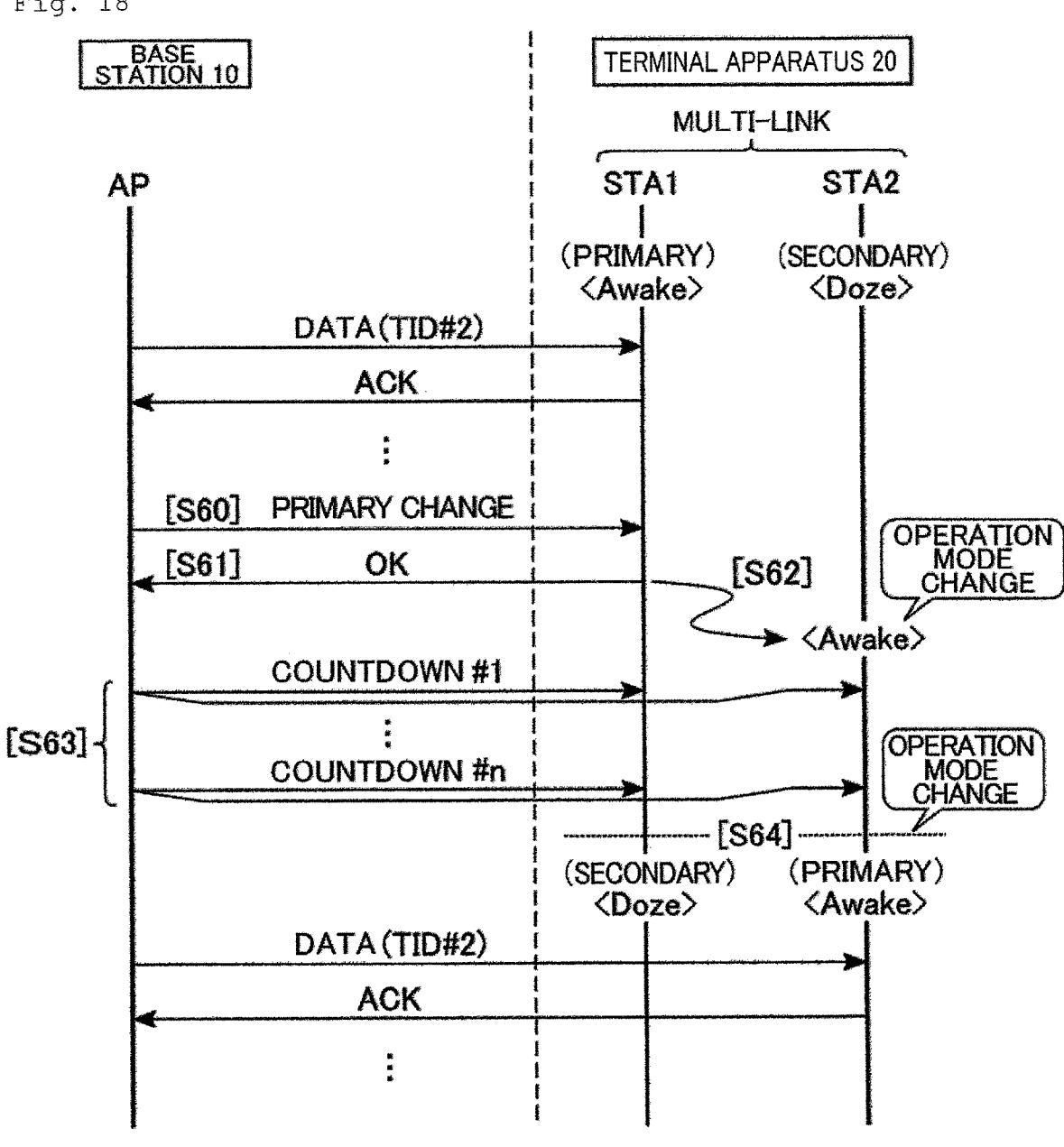
FIG. 18 is a flowchart for describing a specific example of the primary change processing in the wireless system according to the second embodiment.

FIG. 18 is a flowchart for describing a specific example of the primary change processing in the wireless system 1 according to the second embodiment. In the initial state of this example, the link state of the Doze state shown in FIG. 17 is set. That is to say, the STA1 and the STA2 are set to the Awake state and the Doze state, respectively, and the multi-link is in a state in which only the data of TID #2 can be transmitted/received.

When the link management unit 120 of the base station 10 detects that predetermined conditions as described with reference to FIG. 11 is satisfied, the wireless signal requesting the change of the primary link is transmitted to the terminal apparatus 20 by using the primary link (STA1) in the active mode (step S60). When the STA 1 of the terminal apparatus 20 receives the wireless signal, the link management unit 220 of the terminal apparatus 20 confirms whether or not the primary link can be changed.

Also, when the primary link can be changed, the link management unit 220 of the terminal apparatus 20 transmits an affirmative response ("OK") to the access point AP via the STA1 or the STA2 (step S61). When the primary link cannot be changed, the link management unit 220 of the terminal apparatus 20 may transmit a negative response ("NO") to the access point AP via the STA1 or the STA2, as in the first embodiment.

After the processing of step S61, the link management unit 220 first changes the secondary link from the Doze state to the Awake state (step S62). At this time, the secondary link may be set to either the active mode or the intermittent operation mode.

Also, the access point AP transmits a beacon signal including countdown information indicating a timing of changing the primary link to the terminal apparatus 20 (step S63). The illustrated "countdowns #1 to #n" correspond to n counts of beacon signals transmitted to the terminal apparatus 20 before the primary link is changed.

If the countdown by the plurality of beacon signals is completed, each of the link management unit 120 of the base station 10 and the link management unit 220 of the terminal apparatus 20 changes the primary link from the STA1 to the STA2 (step S64). Specifically, the STA1 is changed from the primary link to the secondary link, and the STA2 is changed from the secondary link to the primary link. Furthermore, in the second embodiment, the STA1 changed to the secondary link is set to the Doze state of the operation pause mode in accordance with the change of the primary link. Thus, the multi-link can transmit and receive the data of the TID #2 using the STA2, and the power consumption of the STA1 is minimized.

FIG. 19 shows an example of a change in the link management information 121 due to the primary change processing described with reference to FIG. 18. As shown in FIG. 19, by performing the primary change processing, the setting of the primary/secondary, the setting of the TID, and the setting of the operation mode in the two links constituting the multi-link are exchanged.

Specifically, the STA1 is changed from the primary link in the active mode (Awake state) to the secondary link in the operation pause mode (Doze state) by the primary change processing. On the other hand, the STA2 is changed from the secondary link in the operation pause mode (Doze state) to the primary link in the active mode (Awake state). Note that the setting relating to the association between the traffic and the TID information may be changed or maintained when the primary link is changed. Other operations of the wireless system 1 according to the second embodiment are the same as those of the first embodiment.

<2-2> Effects of Second Embodiment

The power consumption of the multi-link is higher than the power consumption of the single link in which only one STA function is used because a plurality of STA functions are used. Therefore, from the viewpoint of power saving, it is preferable that a single link be used when traffic is not accumulated, and a multi-link is used when traffic is accumulated. Furthermore, from the viewpoint of Low Latency, it is preferable to set a link exclusively used by the Traffic of LL when the Traffic of LL is accumulated. In other words, it is preferable to temporarily set the LL link and the traffic link other than the LL link.

Therefore, the wireless system 1 according to the second embodiment switches between the single link and the multi-link to perform data communication after the multi-link is established. Specifically, after the multi-link is established, the link management unit 120 of the base station 10 and the link management unit 220 of the terminal apparatus 20 control start and stop of the secondary link. Here, "start link" corresponds to setting to the active mode, and "stop link" corresponds to setting to the operation pause mode.

For example, from the viewpoint of power saving, when traffic is not accumulated, only one of the plurality of links constituting the multi-link (primary link) is set to the active mode, and the other links (secondary links) are set to the operation pause mode.

In this case, the multi-link performs data communication in a state substantially similar to that of a single link. On the other hand, when traffic is accumulated, high-speed data communication using a plurality of links constituting the multi-link is performed.

Furthermore, from the viewpoint of Low Latency, when the traffic of LL is not accumulated, the multi-link is used in a substantially single-link state by utilizing the operation pause mode. On the other hand, when the traffic of the LL is accumulated, a plurality of links constituting the multi-link are used, and for example, one link among the plurality of links is assigned as a link dedicated to the traffic of the LL.

As described above, the wireless system 1 according to the second embodiment can minimize power consumption by using the operation pause mode of low power consumption in accordance with the traffic state. Furthermore, the wireless system 1 according to the second embodiment can protect the traffic of LL by controlling the start and stop of the link according to the presence or absence of the traffic of LL.

Furthermore, even when the multi-link and the operation pause mode are combined, the primary change processing described in the first embodiment can be performed. On the other hand, when the base station 10 instructs the terminal apparatus 20 having the secondary link in the operation pause mode to switch the primary link by itself, there is a concern concerning that the link state (primary/secondary) cannot be synchronized on the terminal apparatus 20 side.

Therefore, in the wireless system 1 according to the second embodiment, the link management unit 120 of the base station 10 performs signaling for controlling link start and stop with the terminal apparatus 20 before performing switching of the primary link. This signaling corresponds to, for example, a countdown using a beacon signal. Also, since switching of the primary link is performed by using the primary link before switching, the link management unit 120 of the base station 10 and the link management unit 220 of the terminal apparatus 20 can perform the primary change processing regardless of whether or not the operation pause mode is used.

Thus, the link management unit 220 of the terminal apparatus 20 can know the switching timing of the primary link on the basis of the signaling. As a result, the wireless system 1 according to the second embodiment can reliably perform the primary change processing when the operation pause mode is used. Furthermore, since the wireless system 1 according to the second embodiment also applies the operation pause mode of the secondary link in addition to the switching of the primary link, it is possible to minimize the power consumption when using the multi-link.

Note that the signaling in the primary switching process described above may be performed to perform exclusive control of links to other terminal apparatuses 20 when a plurality of terminal apparatuses 20 are connected to the base station 10 and a certain terminal apparatus 20 has Traffic of LL. In this case, the base station 10 can improve the communication quality of the terminal apparatus 20 having the traffic of LL by changing the setting of the link of the other terminal apparatus 20.

<3> Third Embodiment

A wireless system 1 according to a third embodiment has the same configuration as that of the first embodiment. Also, the wireless system 1 according to the third embodiment appropriately changes channels in the same frequency band after establishing a multi-link. Differences between the wireless system 1 according to the third embodiment and that of the first and second embodiments will be described below.

<3-1> Operation of Wireless System 1
<3-1-1> Regarding Channel

Figure 20:
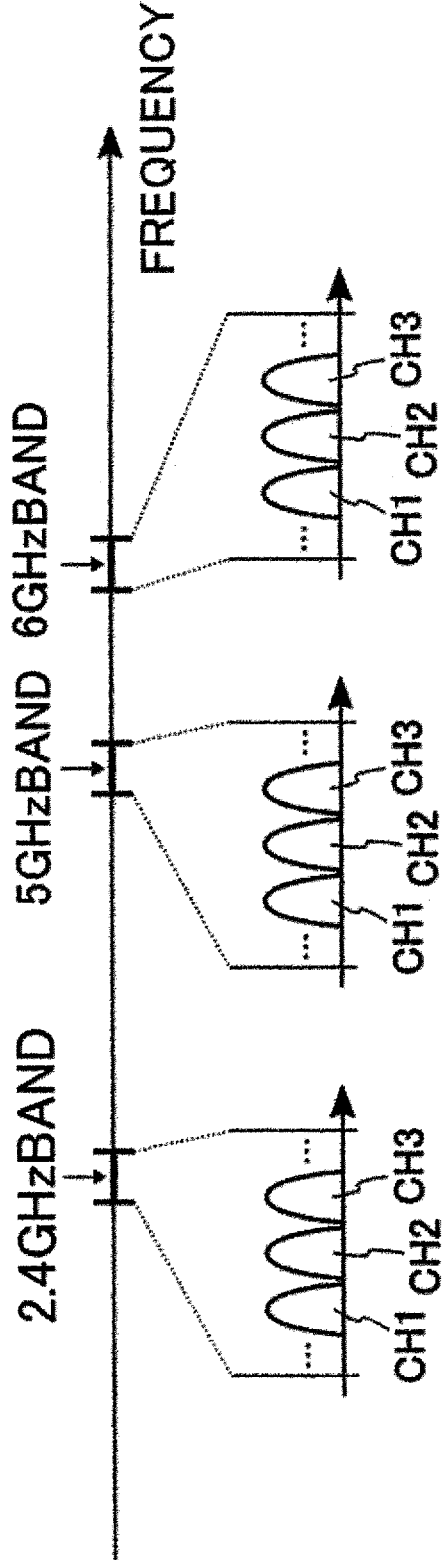
FIG. 20 is a conceptual diagram showing an example of frequency bands used for wireless communication in a wireless system according to a third embodiment.

FIG. 20 shows an example of a frequency band used for wireless communication in the wireless system 1 according to the third embodiment. As shown in FIG. 20, in wireless communication, for example, a 2.4 GHz band, a 5 GHz band, and a 6 GHz band are used. Furthermore, each frequency band includes a plurality of channels. In this example, it is assumed that each of the 2.4 GHz band, the 5 GHz band, and the 6 GHz band includes at least three channels CH1, CH2, and CH3. Communication using each channel CH is realized by the Associated STA Function.

<3-1-2> Regarding Channel Change Processing

Figure 21:
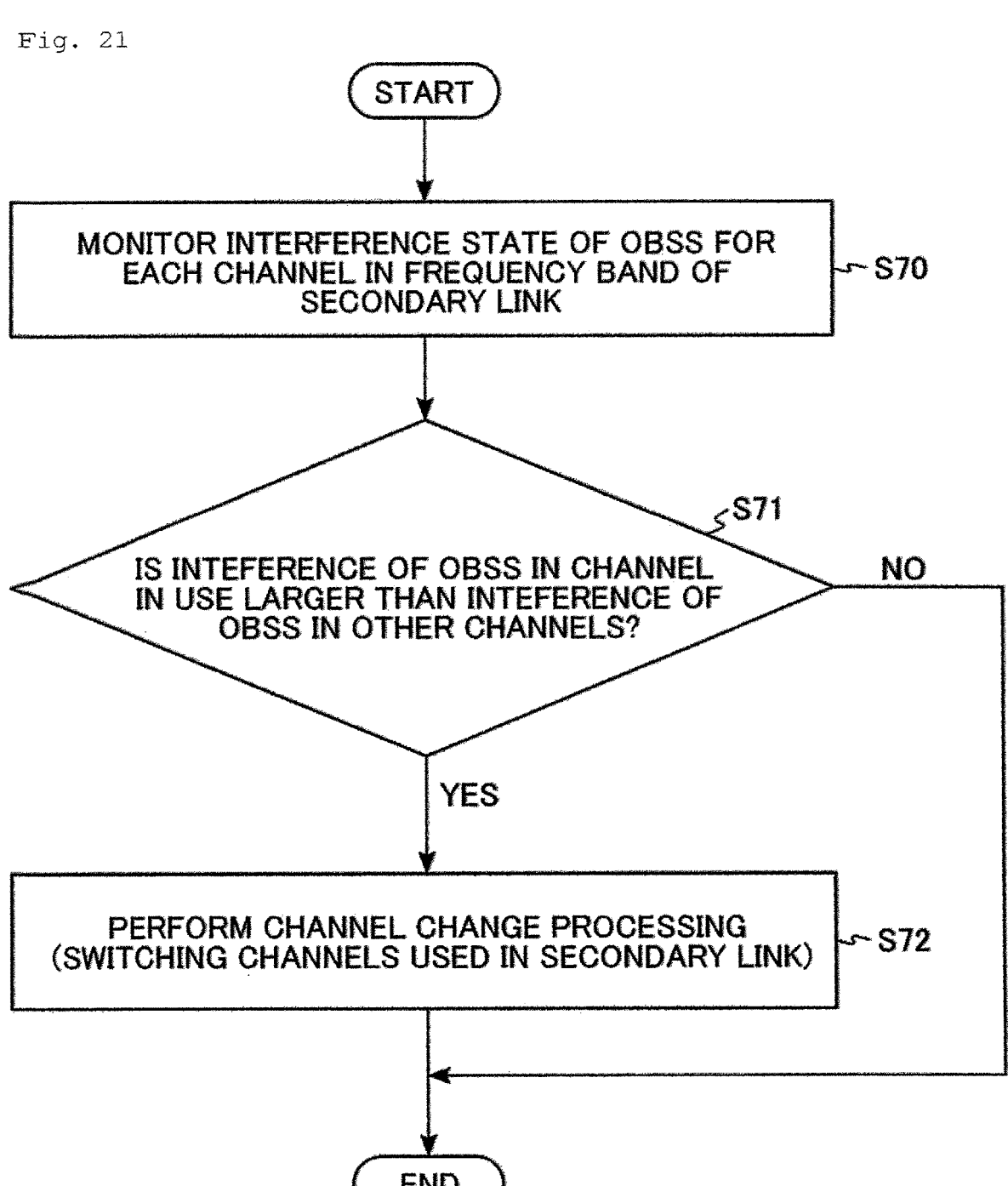
FIG. 21 is a flowchart for describing an example of execution conditions of channel change processing in the wireless system according to the third embodiment.

First, an example of conditions under which the channel change processing is performed will be described. FIG. 21 is a flowchart for describing an example of the conditions under which the channel change processing is performed in the wireless system 1 according to the third embodiment. As shown in FIG. 21, first, a link management unit 120 monitors an interference state of an OBSS for each channel in a frequency band of a secondary link (step S70).

Furthermore, the link management unit 120 confirms whether or not the interference of the OBSS in the channel in use is larger than the interference of the OBSS in the other channels (step S71). For example, the link management unit 120 confirms whether or not a channel occupancy time of the OBSS for the channel in use is larger than a channel occupancy time for the other channels. Note that, for the evaluation of the interference, a time other than the channel occupancy time may be used, and at least a factor for setting the channel to the busy state in a period other than the exchange of the signal of the self BSS may be used. For example, the magnitude of interference power, interference from other communication systems, the presence of noise power, and the like may be used for the evaluation of interference.

When the interference of the OBSS in the channel in use is larger than the interference of the OBSS in the other channels (step S71, YES), the link management unit 120 performs the change of the channel (step S72). If the channel change is performed, the channel used in the secondary link is changed to another channel in the same frequency band.

When the interference of the OBSS in the channel in use is equal to or less than the interference of the OBSS in the other channel (step S71, No) or when the change of the channel in step S72 is completed, the link management unit 120 ends a series of processing relating to the channel change processing. The link management unit 120 can periodically perform the processing of steps S70 and S72 described above.

No that the channel change processing may be appropriately performed on the basis of the continuous monitoring result of the interference state of the OBSS. Furthermore, the trigger for performing the channel change processing is not limited to the interference state of the OBSS. The channel change processing may be performed on the basis of the radio wave intensity of each link. In this case, the link management unit 120 confirms whether or not, for example, the radio wave intensity of a channel in use is weaker than the radio wave intensity of other channels in the same frequency band. Furthermore, although the base station 10 may not directly monitor the interference state in this way, the terminal apparatus 20 may monitor the interference state and transmit the monitoring result to the base station 10. In this case, the base station 10 performs channel change processing by using the monitoring result.

Figure 22:
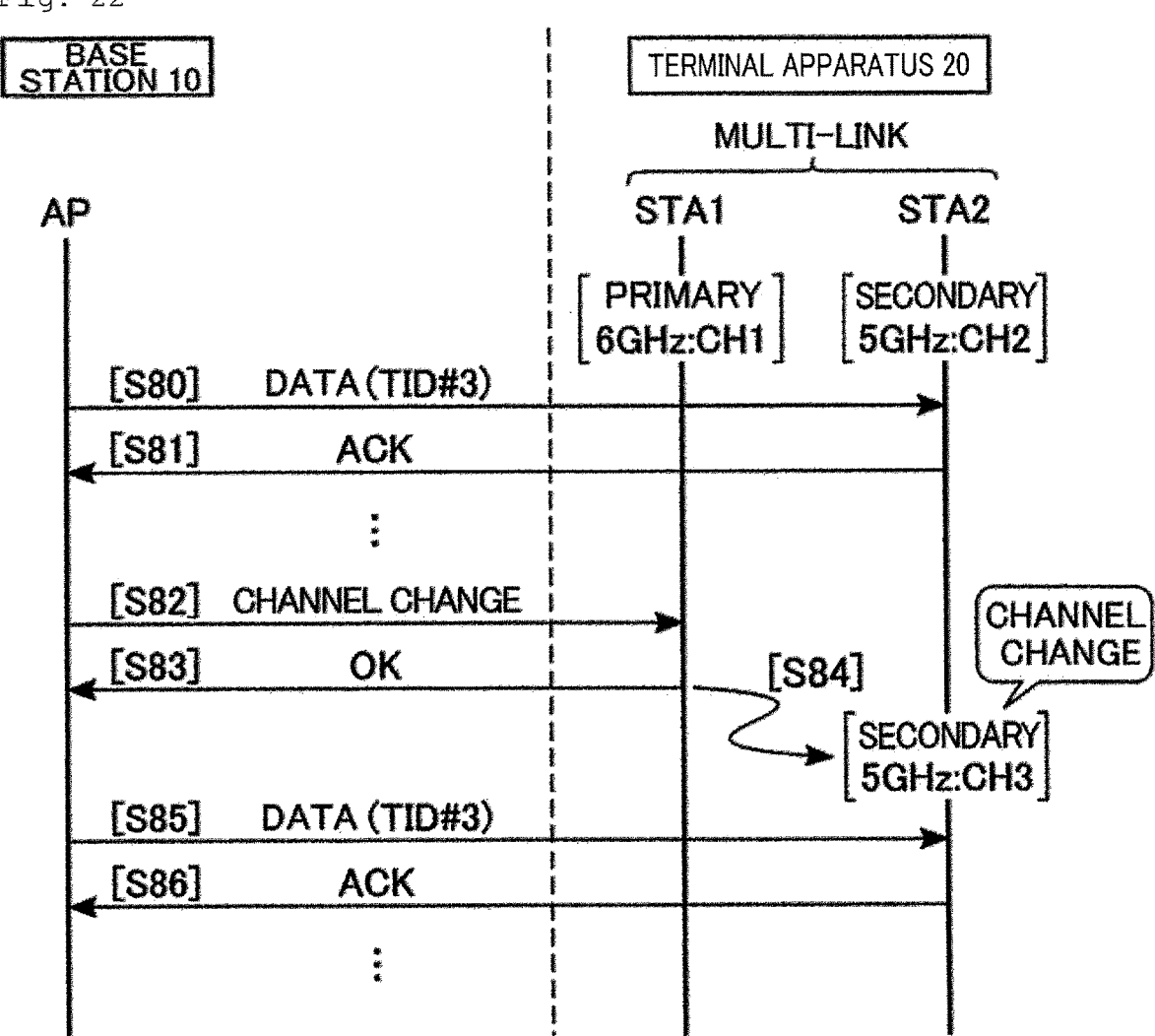
FIG. 22 is a flowchart for describing a specific example of the channel change processing in the wireless system according to the third embodiment.

A specific example of the channel change processing will be described below with reference to FIG. 22. FIG. 22 is a flowchart for describing a specific example of the channel change processing in the wireless system 1 according to the third embodiment. Note that, in the initial state of this example, a multi-link by a channel CH1 of the STA1 and a channel CH2 of the STA2 is set to the link state shown in FIG. 9.

When the data of TID #3 is transmitted from the access point AP to the terminal apparatus 20 in this state, the STA2 of the terminal apparatus 20 receives the data (step S80). Also, the STA2 of the terminal apparatus 20 transmits a wireless signal ("ACK") notifying that the data has been received to the access point AP (step S81).

If the link management unit 120 of the base station 10 detects that the predetermined condition as described with reference to FIG. 21 is satisfied, a wireless signal requesting channel changing is transmitted to the terminal apparatus 20 using the primary link (step S82). If the STA 1 of the terminal apparatus 20 receives the wireless signal, the link management unit 220 of the terminal apparatus 20 confirms whether or not the channel can be changed.

Furthermore, when the channel can be changed, the link management unit 220 transmits an affirmative response ("OK") to the access point AP via the STA1 or the STA2 (step S83). Note that, when the channel cannot be changed, the link management unit 220 of the terminal apparatus 20 transmits a negative response ("NO") to the access point AP via the STA1 or the STA2.

After the processing of step S83, each of the link management unit 120 of the base station 10 and the link management unit 220 of the terminal apparatus 20 changes a channel of 5 GHz used as secondary link from, for example, "CH2" to "CH3" (step S84).

If the data of TID #3 is transmitted from the access point AP to the terminal apparatus 20 after the channel change in step S84 is performed, the STA2 of the terminal apparatus 20 changed to a channel CH3 of 5 GHz receives the data (step S85). Moreover, the STA2 of the terminal apparatus 20 transmits a wireless signal ("ACK") notifying that the data has been received to the access point AP (step S86).

FIG. 23 shows an example of a change in the link management information 121 due to the channel change processing described with reference to FIG. 22. As shown in FIG. 23, the channel change processing is performed to change the channel ID corresponding to the secondary link among the plurality of links constituting the multi-link.

Specifically, the channel of the STA2 which is set to the secondary link and uses a frequency band of 5 GHz is changed from "CH2" to "CH3" by the channel change processing. Note that the setting relating to the association between the traffic and the TID information may be changed or maintained when the channel is changed.

Figure 24:
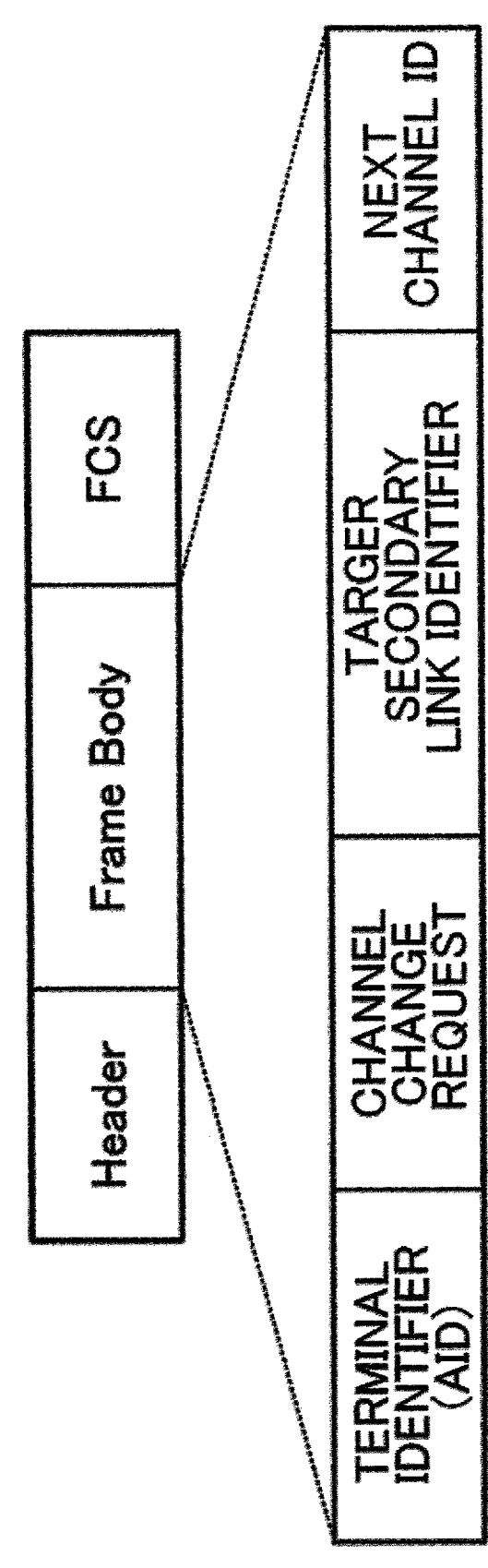
FIG. 24 is a conceptual diagram showing a specific example of a wireless frame used in the channel change processing of the wireless system according to the third embodiment.

FIG. 24 shows a specific example of a wireless frame used in the channel change processing of the wireless system 1 according to the third embodiment FIG. 24 corresponds to a wireless frame to be transmitted when the access point AP requests the terminal apparatus 20 to change the channel of the secondary link.

As shown in FIG. 24, the Frame Body of the wireless frame requesting the channel change processing includes, for example, a terminal apparatus identifier AID, a channel change request, an identifier of the target secondary link, and the next channel ID. The link management unit 220 of the terminal apparatus 20 corresponding to the AID refers to the "identifier of the target secondary link" and the "next channel ID" on the basis of the "channel change request" and determines whether or not the channel of the secondary link can be changed. In addition, in response to the channel change request, for example, a wireless frame similar to that of FIG. 15 described in the first embodiment is used. Other operations of the wireless system 1 according to the third embodiment are the same as those of the first embodiment.

<3-2> Effects of Third Embodiment

Although a case in which the primary link is switched in accordance with the communication quality of different frequency bands was described in the first embodiment, the communication quality may be different even between channels of the same frequency band. For example, the communication quality of the secondary link may change depending on the channel used, such as the interference state due to OBSS and the strength of radio waves even in the same frequency band. Therefore, in the wireless system 1, it may be preferable to switch the channel of the secondary link used as the sub-line when the primary link is used as the main line for data communication at the time of multi-link in some cases.

Therefore, the wireless system 1 according to the third embodiment switches the channel used for the secondary link in accordance with the communication quality of each channel used for the multi-link. For example, the link management unit 120 of the base station 10 monitors the interference state of each channel in the frequency band of the secondary link (2.4/5/6 GHz band, and the like). Furthermore, when the link management unit 120 detects, for example, "interference of OBSS in a channel under use> interference of OBSS in other channels", the channel of the secondary link is switched to a channel having the least interference in the same frequency band.

As described above, in the wireless system 1 according to the third embodiment, the communication quality of the secondary link is maintained in a high state by appropriately changing the channel used in the secondary link on the basis of predetermined conditions. As a result, the wireless system 1 according to the third embodiment can improve the communication quality of the multi-link.

Note that, as a predetermined condition for performing the channel change processing, all parameters relating to the communication quality of each link can be used. Furthermore, although a case in which the channel of the secondary link is changed was exemplified in the third embodiment, the channel of the primary link may be changed by the channel change processing.

Furthermore, when a plurality of terminal apparatuses 20 are connected to the base station 10, the base station 10 may perform channel change processing collectively on the plurality of terminal apparatuses 20. In this case, the link management unit 120 of the base station 10 changes the channel of the secondary link, for example, when receiving an affirmative response from all the terminal apparatuses 20 whose channels are to be changed.

<3-3> Modification of Third Embodiment

The wireless system 1 described in the third embodiment is merely an example, and various modifications are possible. A first modification and a second modification of the third embodiment will be described below in order.

<3-3-1> First Modification of Third Embodiment

Figure 25:
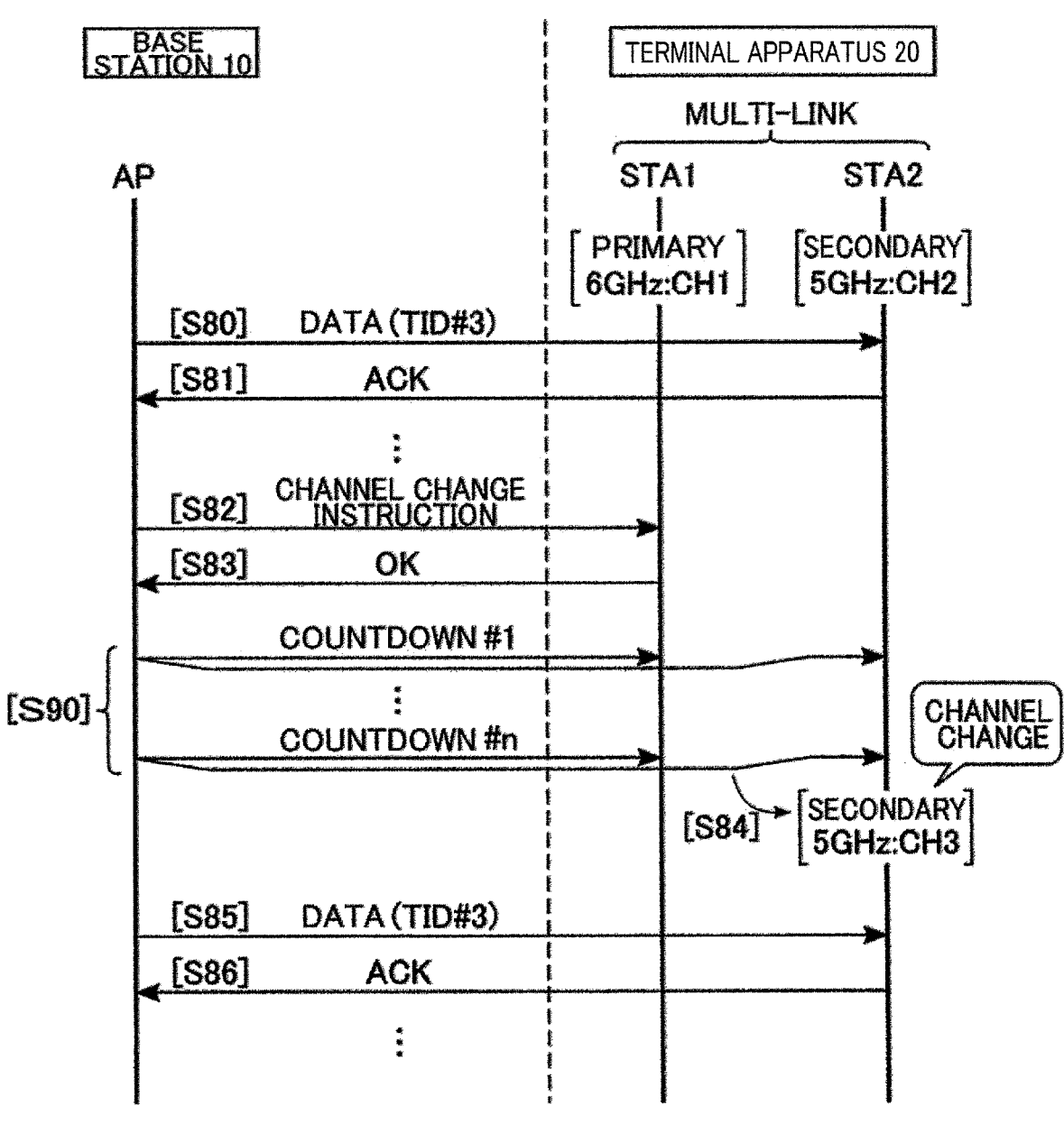
FIG. 25 is a flowchart for describing a specific example of channel change processing in a wireless system according to a first modification of the third embodiment.

The first modification of the third embodiment is a combination of signaling in the third embodiment and the second embodiment. FIG. 25 is a flowchart for describing a specific example of the channel change processing in the first modification of the third embodiment. The flowchart shown in FIG. 25 has a configuration in which step S90 is added between steps S83 and S84 of the flowchart shown in FIG. 22.

Specifically, the access point AP instructs the terminal apparatus 20 to change a channel (step S82), and the terminal apparatus 20 transmits an affirmative response to the access point AP (step S83). Thus, the access point AP transmits a beacon signal including countdown information indicating a timing of changing a channel of the secondary link to the terminal apparatus 20 (step S90). The illustrated "countdowns #1 to #n" correspond to n counts of beacon signals transmitted to the terminal apparatus 20 before the channel of the secondary link is changed.

If the countdown by a plurality of beacon signals is completed, each of the link management unit 120 of the base station 10 and the link management unit 220 of the terminal apparatus 20 changes a channel of the secondary link (STA2) from, for example, CH2 to CH3 (step S84). Other configurations and operations of the wireless system 1 according to the second modification of the third embodiment are the same as those of the third embodiment.

As described above, in the wireless system 1 according to the first modification of the third embodiment, the countdown information is transmitted before the channel is changed. In other words, the access point AP performs signaling with the terminal apparatus 20 before performing the switching of the channel of the secondary link. Thus, the link management unit 220 of the terminal apparatus 20 can know the channel switching timing on the basis of the signaling, and can reliably perform the channel switching.

Furthermore, the channel change using signaling in the first modification of the third embodiment may be performed for a plurality of terminal apparatuses 20 connected to the access point AP. The access point AP can synchronously switch channels of a plurality of terminal apparatuses 20 in the BSS by using signaling as in the first modification of the third embodiment. Such an operation is effective, for example, when establishing exclusive control of the link as described in the effect of the second embodiment.

<3-3-2> Second Modification of Third Embodiment

Figure 26:
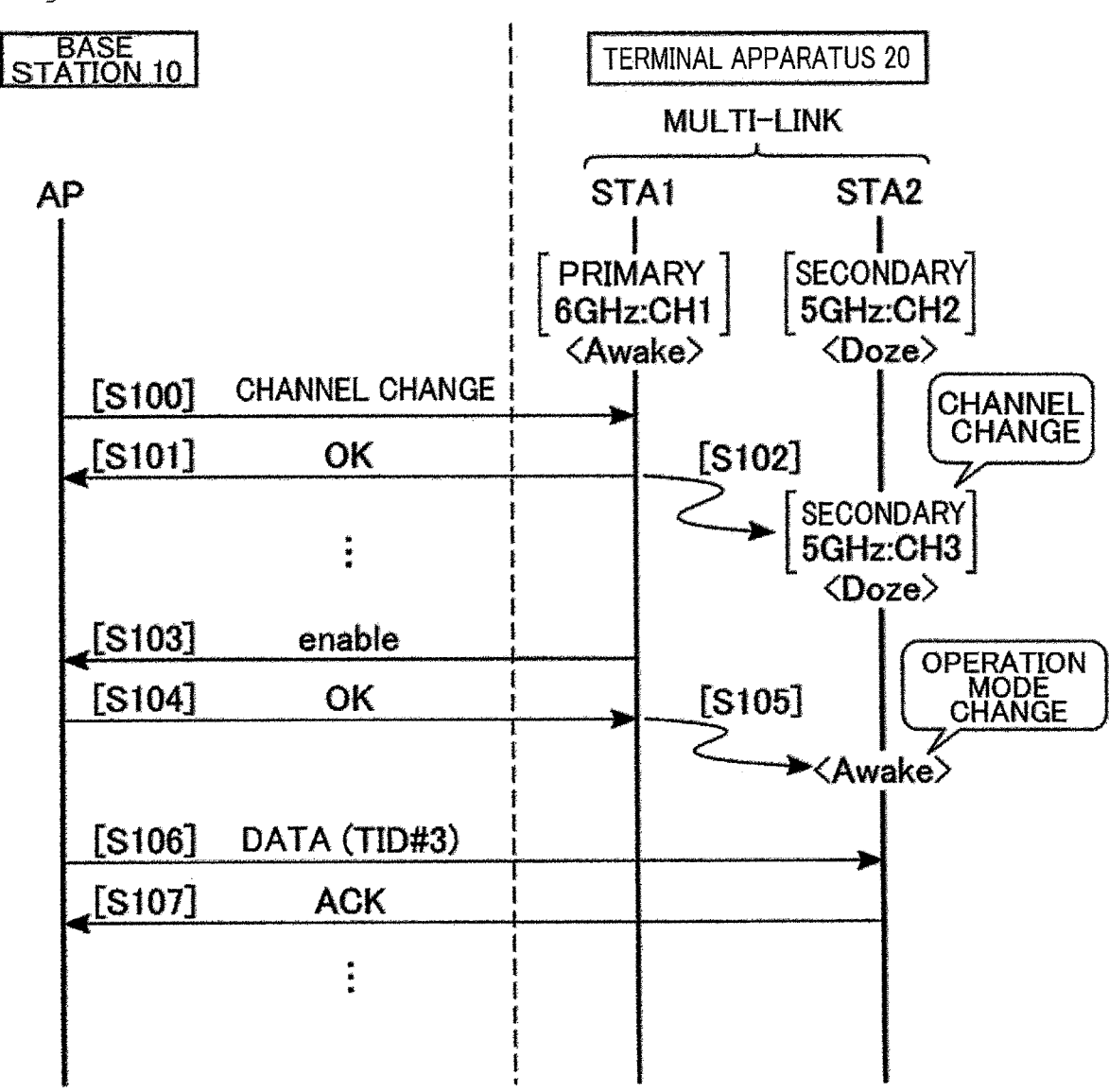
FIG. 26 is a flowchart for describing a specific example of channel change processing in a wireless system according to a second modification of the third embodiment.

A second modification of the third embodiment is a combination of the third embodiment and the multi-link power save in the second embodiment. FIG. 26 is a flowchart for describing a specific example of the channel change processing in the second modification of the third embodiment. In the initial state of this example, a multi-link by the channel CH1 of the STA1 and the channel CH2 of the STA2 is set for the link state shown in FIG. 9, and the STA1 and the STA2 are set to the Awake state (active mode or intermittent operation mode) or the Doze state (operation pause mode), respectively.

If the link management unit 120 of the base station 10 detects that the predetermined condition as described with reference to FIG. 21 is satisfied, as shown in FIG. 26, a wireless signal requesting a channel change is transmitted to the terminal apparatus 20 using the primary link (STA1) in the Awake state (step S100). If the STA 1 of the terminal apparatus 20 receives the wireless signal, the link management unit 220 of the terminal apparatus 20 confirms whether or not the channel of the secondary link can be changed.

Also, when the channel of the secondary link can be changed, the link management unit 220 of the terminal apparatus 20 transmits an affirmative response ("OK") to the access point AP via the STA 1 (step S101). Note that, when the channel of the secondary link cannot be changed, the link management unit 220 of the terminal apparatus 20 may transmit a negative response ("NO") to the access point AP via the STA 1 as in the third embodiment.

After the processing of step S101, each of the link management unit 120 of the base station 10 and the link management unit 220 of the terminal apparatus 20 changes a channel of the secondary link from CH2 to CH3 in a state in which the secondary link maintains the Doze state of the operation pause mode (step S102).

After that, if detecting that the predetermined condition as described in the second embodiment is satisfied, the link management unit 220 of the terminal apparatus 20 transmits an Awake transition request signal to the access point AP using the primary link node STA1 (step S103). If the STA 1 of the base station 10 receives the Awakeup transition request signal, the link management unit 120 of the base station 10 transmits an affirmative response ("OK") to the terminal apparatus 20 using the primary link (step S104).

If the terminal apparatus 20 receives an affirmative response in step S104, the link management unit 220 of the terminal apparatus changes the STA2 set as the secondary link to the active mode (step S105). At this time, the link management unit 220 controls the STA2 on the basis of the setting changed by the processing of step S102. That is to say, the STA 2 of the terminal apparatus 20 wakes up in a communicable state using a channel CH3 of 5 GHz.

That is to say, when the data of TID #3 is transmitted from the access point AP to the terminal apparatus 20 after the channel change in step S105 is performed, the STA2 of the terminal apparatus 20 changed to the channel CH3 of 5 GHz receives the data (step S106). Also, the STA2 of the terminal apparatus 20 transmits a wireless signal ("ACK") notifying that the data has been received to the access point AP (step S107). Other configurations and operations of the wireless system 1 according to the second modification of the third embodiment are the same as those of the third embodiment.

As described above, in the second modification of the third embodiment, the channel change processing is performed when the secondary link is in the operation pause mode. If the access point AP performs channel change by itself when the secondary link is in the operation pause mode, there is a concern concerning that the wake-up STA function does not operate on the appropriate channel. On the other hand, the access point AP in the second modification of the third embodiment notifies the terminal apparatus 20 of the change of the channel of the secondary link by using the primary link.

Thus, the wireless system 1 according to the second modification of the third embodiment can reliably perform channel change processing for the secondary link when the operation pause mode is used. Furthermore, the STA function which has been waked up from the operation pause mode can communicate with the appropriate channel by confirming the association between the STA function and the channel by the link management unit 220.

<4> Others

Although a case in which the access point AP transmits data to the terminal apparatus 20 was exemplified in the above embodiment, the terminal apparatus 20 may transmit data to the access point AP during multi-link. When the multi-link state is changed, the link management units 120 and 220 update the link management information 121 and 221 respectively. The link management units 120 and 220 may update the association between the traffic and the STA function in accordance with an increase or decrease in the number of links.

Although a case in which the terminal apparatus 20 requests the base station 10 to establish a multi-link in the multi-link processing was exemplified in the above embodiment, the present invention is not limited to this. For example, the base station 10 may request the terminal apparatus 20 to establish a multi-link on the basis of establishment of a plurality of links between the base station 10 and the terminal apparatus 20.

Although a case in which the primary link and the secondary link are respectively set to the active mode after the multi-link processing was exemplified in the above embodiment, the present invention is not limited to this. When the multi-link is established, at least the primary link may be set to the active mode, and the secondary link may be set to either the active mode or the operation pause mode.

The secondary link may be switched between the operation pause mode and the active mode on the basis of the predetermined conditions.

Although a case in which the multi-link is established by using STA functions of different frequency bands was exemplified in the above embodiment, the present invention is not limited to this. A multi-link may be established between the base station 10 and the terminal apparatus 20 by using a plurality of channels CH included in the same frequency band. For example, a plurality of STA functions may form a multi-link using different channels in the 5 GHz body. Also in such a case, the primary change processing described in the first and second embodiments and the channel change processing described in the third embodiment can be performed.

The configuration of the wireless system 1 according to the embodiment is merely an example, and other configurations may be used. For example, although a case was illustrated in which each of the base station 10 and the terminal apparatus 20 has three STA functions (wireless signal processing units), the present invention is not limited to this. The base station 10 may include at least two wireless signal processing units. Similarly, the terminal apparatus 20 may include at least two wireless signal processing units. Also, the number of channels which can be processed by each STA function can be set as appropriate in accordance with the frequency band to be used. Each of the wireless communication modules 14 and 24 may support wireless communication in a plurality of frequency bands using a plurality of communication modules, or may support wireless communication in a plurality of frequency bands using a single communication module.

Also, the functional configurations of the base station 10 and the terminal apparatus 20 in the wireless system 1 according to the embodiment are merely examples. The functional configuration of the base station 10 and the terminal apparatus 20 may have other names and groupings as long as the operations described in each embodiment can be performed. For example, in the base station 10, the data processing unit 110 and the link management unit 120 may be collectively referred to as a data processing unit. Similarly, in the terminal apparatus 20, the data processing unit 210 and the link management unit 220 may be collectively referred to as a data processing unit.

Also, in the wireless system 1 according to the embodiment, a central processing unit (CPU) included in each of the base station 10 and the terminal apparatus 20 may be another circuit. For example, a micro processing unit (MPU) or the like may be used instead of the CPU. Also, each of the processes described in each embodiment may be realized using dedicated hardware. The wireless system 1 according to each embodiment may have processes executed by software and processes executed by hardware, or may have only one of them.

In each embodiment, the flowchart used to describe the operations is merely an example. Each operation described in the embodiment may be interchanged within the range in which the order of processing is possible, or other processing may be added. Also, the format of the wireless frame described in the above embodiment is merely an example. The wireless system 1 may use other wireless frame formats as long as it is possible to perform the operations described in each embodiment.

Note that the present invention is not limited to the above embodiments, and can be modified in various ways at the implementation stage without departing from the scope thereof. In addition, each embodiment may be carried out in combination as appropriate, and in that case, the combined effect can be obtained. Furthermore, the above-described embodiment includes various inventions, and various inventions can be extracted by a combination selected from a plurality of disclosed constituent requirements. For example, even if some constituent elements are omitted from all of the constituent elements shown in the embodiment, if the problem can be solved and the effect is obtained, the configuration in which the constituent elements are deleted can be extracted as an invention.

REFERENCE SIGNS LIST

1 Wireless system
10 Base station
20 Terminal apparatus
30 Server
11, 21 CPU
12, 22 ROM
13, 23 RAM
14, 24 Wireless communication module
15 Wired communication module
25 Display
26 Storage
110, 210 Data processing unit
120, 220 Link management unit
121,221 Link management information
122, 222 Association processing unit
123, 223 Authentication processing unit
124 Data categorization unit
125 Transmission queue
126 CSMA/CA execution unit
127 Data collision management unit
130, 140, 150, 230, 240, 250 Wireless signal processing unit

The invention claimed is:

1. A base station, comprising:
a first wireless signal processing circuit configured to transmit and receive a wireless signal using a first channel;
a second wireless signal processing circuit configured to transmit and receive a wireless signal using a second channel different from the first channel; and
processing circuitry configured to establish a multi-link with a terminal apparatus by using the first wireless signal processing circuit and the second wireless signal processing circuit, wherein
the processing circuitry is further configured to:
transmit a first wireless frame requesting a change in a channel of the second wireless signal processing circuit to the terminal apparatus by using the first wireless signal processing circuit, and
transmit a second wireless frame including information indicating a timing of the change by using at least one of the first wireless signal processing circuit and the second wireless signal processing circuit if either the first wireless signal processing circuit or the second wireless signal processing circuit receives a first affirmative response to the first wireless frame;
change the channel of the second wireless signal processing circuit from the second channel to a third channel different from each of the first channel and the second channel at the timing; and
the processing circuitry is further configured to:
transmit a third wireless frame requesting a change of the channel of the second wireless signal processing circuit to the terminal apparatus by using the first wireless signal processing circuit when the second wireless signal processing circuit is set to an operation pause mode;

change the channel of the second wireless signal processing circuit from the second channel to the third channel while maintaining the channel in the operation pause mode if either the first wireless signal processing circuit or the second wireless signal processing circuit receives a second affirmative response to the third wireless frame, and communicate with the second wireless signal processing circuit using the third channel after the change in the channel of the second wireless signal processing circuit is applied and the second wireless signal processing circuit wakes up from the operation pause mode to an active mode.

* * * * *